(12) United States Patent
Wada et al.

(10) Patent No.: US 12,459,741 B2
(45) Date of Patent: Nov. 4, 2025

(54) ARTICLE TRANSPORT FACILITY

(71) Applicant: Daifuku Co., Ltd., Osaka (JP)

(72) Inventors: Yoshinari Wada, Hinocho (JP); Kenji Tamura, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 593 days.

(21) Appl. No.: 17/980,784

(22) Filed: Nov. 4, 2022

(65) Prior Publication Data

US 2023/0143085 A1 May 11, 2023

(30) Foreign Application Priority Data

Nov. 5, 2021 (JP) ................................. 2021-181421
Nov. 5, 2021 (JP) ................................. 2021-181422
Nov. 5, 2021 (JP) ................................. 2021-181423

(51) Int. Cl.
*B65G 1/137* (2006.01)

(52) U.S. Cl.
CPC .................................. *B65G 1/1375* (2013.01)

(58) Field of Classification Search
CPC .................................................. B65G 1/1375
See application file for complete search history.

(56) References Cited

U.S. PATENT DOCUMENTS

| 6,427,824 | B1* | 8/2002 | Murata | B66C 11/08 |
| | | | | 414/940 |
| 2016/0288802 | A1* | 10/2016 | Kinugawa | B61B 3/02 |
| 2018/0099680 | A1* | 4/2018 | Murakami | B60L 5/00 |
| 2019/0019707 | A1 | 1/2019 | Suzuki | |
| 2022/0020621 | A1* | 1/2022 | Ogo | B66C 7/02 |
| 2022/0032971 | A1* | 2/2022 | Ogo | B66C 7/02 |
| 2022/0244742 | A1* | 8/2022 | Kitamura | G06Q 10/08 |
| 2022/0332500 | A1* | 10/2022 | Masuda | B65G 1/0457 |
| 2022/0340363 | A1* | 10/2022 | Ogo | B65G 1/0457 |

FOREIGN PATENT DOCUMENTS

JP WO2017150005 A1 9/2017

* cited by examiner

*Primary Examiner* — Kyle O Logan
(74) *Attorney, Agent, or Firm* — The Webb Law Firm

(57) ABSTRACT

An article transport facility includes a first rail and a second rail. The second rail is spaced upward relative to the first rail, and intersects the first rail in a view in an up-down direction. The transport vehicle includes a vehicle body disposed between the first rail and the second rail in the up-down direction, a first traveling unit that causes the vehicle body to travel along a first direction, and a second traveling unit that causes the vehicle body to travel along a second direction.

20 Claims, 12 Drawing Sheets

ARTICLE TRANSPORT FACILITY

CROSS-REFERENCE TO RELATED APPLICATIONS

This application is claims priority to Japanese Patent Application Nos. 2021-181421 filed Nov. 5, 2021, 2021-181422 filed Nov. 5, 2021, and 2021-181423 filed Nov. 5, 2021, the disclosures of which are hereby incorporated by reference in their entirety.

BACKGROUND OF THE INVENTION

1. Field of the Invention

The present invention relates to an article transport facility including a transport vehicle for transporting an article.

2. Description of the Related Art

An example of such an article transport facility is disclosed in Japanese Patent Application Laid-Open No. 2017-150005 (Patent Document 1). In the following description of the background art, reference numerals in parentheses refer to Patent Document 1.

The article transport facility disclosed in Patent Document 1 includes a travel rail (4) on which a transport vehicle (8) travels. A first rail (9) and a second rail (11) extending in different directions intersect in the same horizontal plane to form the travel rail (4). The transport vehicle (8) is configured to be able to travel along the first rail (9) and to travel along the second rail (11). That is, the transport vehicle (8) can travel in two different directions.

In the article transport facility disclosed in Patent Document 1, two travel routes, that is, the first rail (9) and the second rail (11), intersect in the same horizontal plane, and therefore a level difference is likely to be formed at an intersection portion (14) where both rails intersect. For this reason, there is a high likelihood that the transport vehicle (8) will vibrate when passing through the intersection portion (14). Also, for example, if the travel rail (4) is integrally formed in such a manner that there is no seam between the first rail (9) and the second rail (11) that intersect each other, this causes an increase in the size of the travel rail (4). In this case, there are more restrictions when installing the travel rail (4) in the article transport facility.

SUMMARY OF THE INVENTION

In view of the above-mentioned situation, it is desired that vibration of the transport vehicle is suppressed and a degree of freedom in setting the travel route is ensured in an article transport facility including a travel route in which a plurality of routes with different extension directions intersect each other.

A technique for solving the above problems is as follows.

An article transport facility including a transport vehicle configured to transport an article, the article transport facility including:

at least one first rail including a first travel surface; and
at least one second rail including a second travel surface, in which the at least one second rail is spaced upward relative to the at least one first rail and intersects the at least one first rail in a view in an up-down direction,
the transport vehicle includes a vehicle body disposed between the at least one first rail and the at least one second rail in the up-down direction, a first traveling unit configured to cause the vehicle body to travel along a first direction corresponding to a direction in which the at least one first rail extends, a second traveling unit configured to cause the vehicle body to travel along a second direction corresponding to a direction in the at least one second rail extends, and a control unit configured to control operations of the first traveling unit and the second traveling unit,
the first traveling unit includes a first wheel and a first orientation changing mechanism configured to change an orientation of the first wheel relative to the vehicle body, and the first traveling unit is configured to perform an orientation change between a first wheel placement orientation, in which the first wheel is placed on the first travel surface, and a first wheel retraction orientation, in which the first wheel is separated from the first travel surface,
the second traveling unit includes a second wheel and a second orientation changing mechanism configured to change an orientation of the second wheel relative to the vehicle body, and the second traveling unit is configured to perform an orientation change between a second wheel placement orientation, in which the second wheel is placed on the second travel surface, and a second wheel retraction orientation, in which the second wheel is separated from the second travel surface, and
the control unit is configured to change in mode between (i) a first mode of causing the vehicle body to travel along the at least one first rail with the first traveling unit in the first wheel placement orientation and the second traveling unit in the second wheel retraction orientation, and (ii) a second mode of causing the vehicle body to travel along the at least one second rail with the second traveling unit in the second wheel placement orientation and the first traveling unit in the first wheel retraction orientation.

According to this configuration, it is possible to cause the transport vehicle to travel in the first direction along the first rail, and to cause the transport vehicle to travel in the second direction along the second rail. The second rail is spaced upward relative to the first rail. That is, the first rail and the second rail are disposed at different positions in the up-down direction. As a result, the travel route along the first rail and the travel route along the second rail can be disposed in different horizontal planes while intersecting each other in a view in the up-down direction. Accordingly, with this configuration, there is no seam between the first rail and the second rail, and no level difference is formed due to the existence of the seam, and therefore it is possible to prevent vibration that occurs when the transport vehicle travels in the portion where both rails intersect. Also, since the first rail and the second rail are physically spaced apart from each other, the first rail and the second rail can be installed at different times. Accordingly, it is possible to ensure a degree of freedom when installing the travel route constituted by the first rail and the second rail in the article transport facility. As described above, according to this configuration, it is possible to suppress vibration of the transport vehicle and to ensure a degree of freedom in the installation of the travel route in the article transport facility including the travel route in which a plurality of routes with different extension directions intersect each other.

Further features and advantages of the technique according to the present disclosure will become evident from the following description of exemplary and non-limiting embodiments described with reference to the drawings.

DESCRIPTION OF THE INVENTION

Embodiments of an article transport facility will be described below with reference to the drawings.

Figure 1:
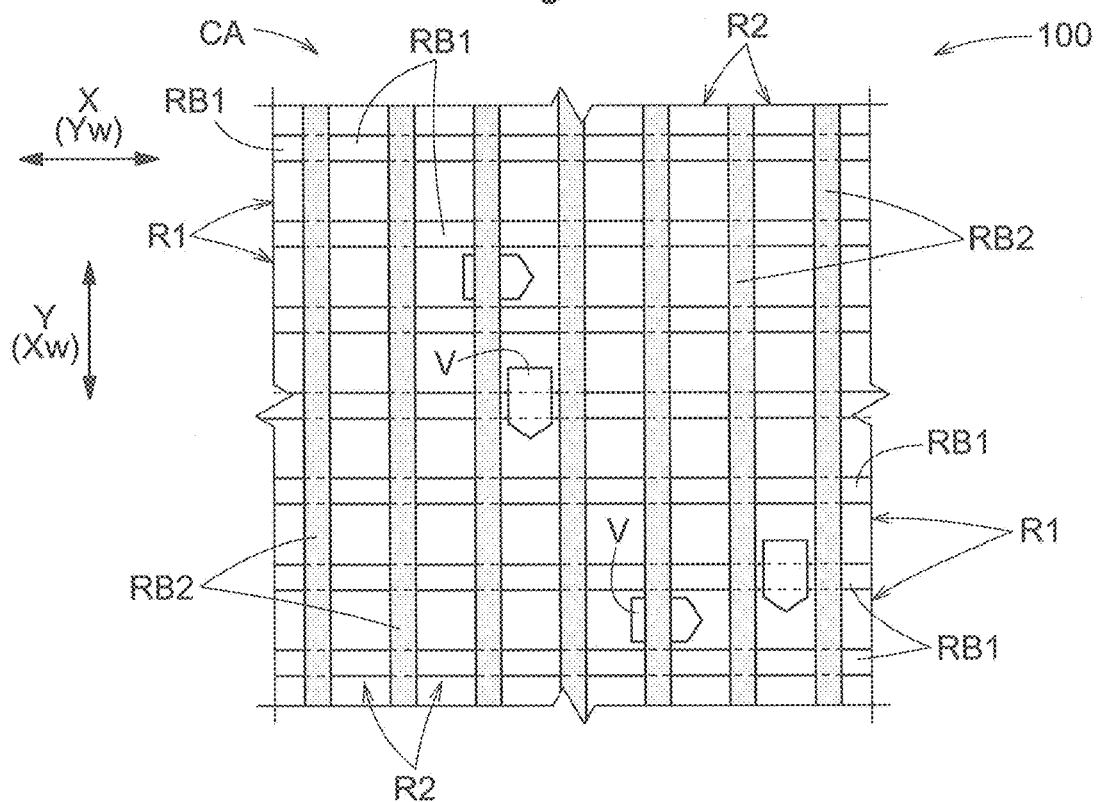
FIG. 1 is a plan view showing an intersection area of an article transport facility.
Figure 2:
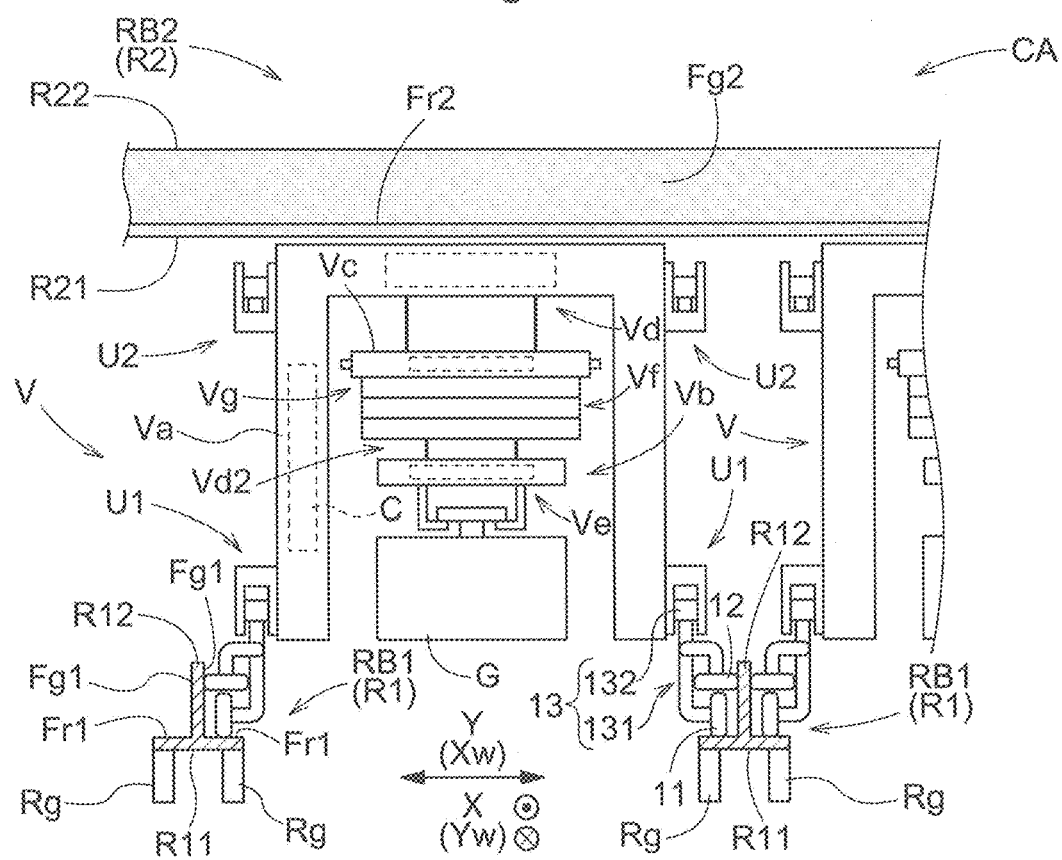
FIG. 2 is a view of a transport vehicle in a first direction during execution of a first mode.
Figure 3:
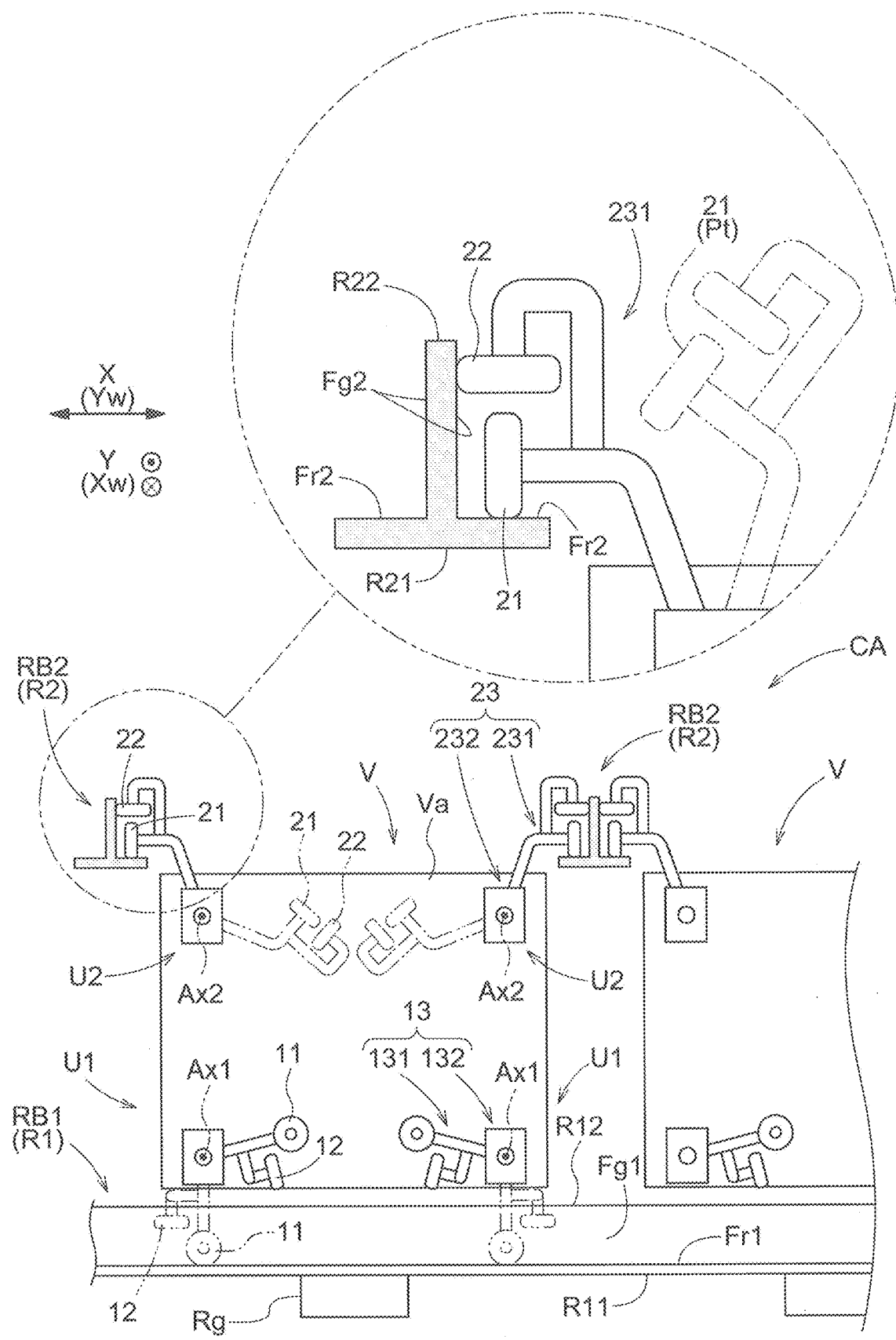
FIG. 3 is a view of the transport vehicle in a second direction during execution of a second mode.

As shown in FIGS. 1 to 3, an article transport facility 100 includes transport vehicles V for transporting an article G, first rails R1 including first travel surfaces Fr1, and second rails R2 including second travel surfaces Fr2. The transport vehicles V can travel along the first rails R1 and travel along the second rails R2. That is, the travel route of the transport vehicles V is set along the first rails R1 and the second rails R2.

Hereinafter, the extension direction of the first rails R1 is a first direction X, and the extension direction of the second rails R2 is a second direction Y. Also, a direction orthogonal to the first direction X in a view along an up-down direction is a first width direction Xw, and a direction orthogonal to the second direction Y in a view in the up-down direction is a second width direction Yw. In this embodiment, the first direction X and the second direction Y are orthogonal to each other in a view in the up-down direction. That is, in the present embodiment, the first width direction Xw orthogonal to the first direction X in a view in the up-down direction is equal to the second direction Y. Also, the second width direction Yw orthogonal to the second direction Y in a view in the up-down direction is equal to the first direction X.

Figure 4:
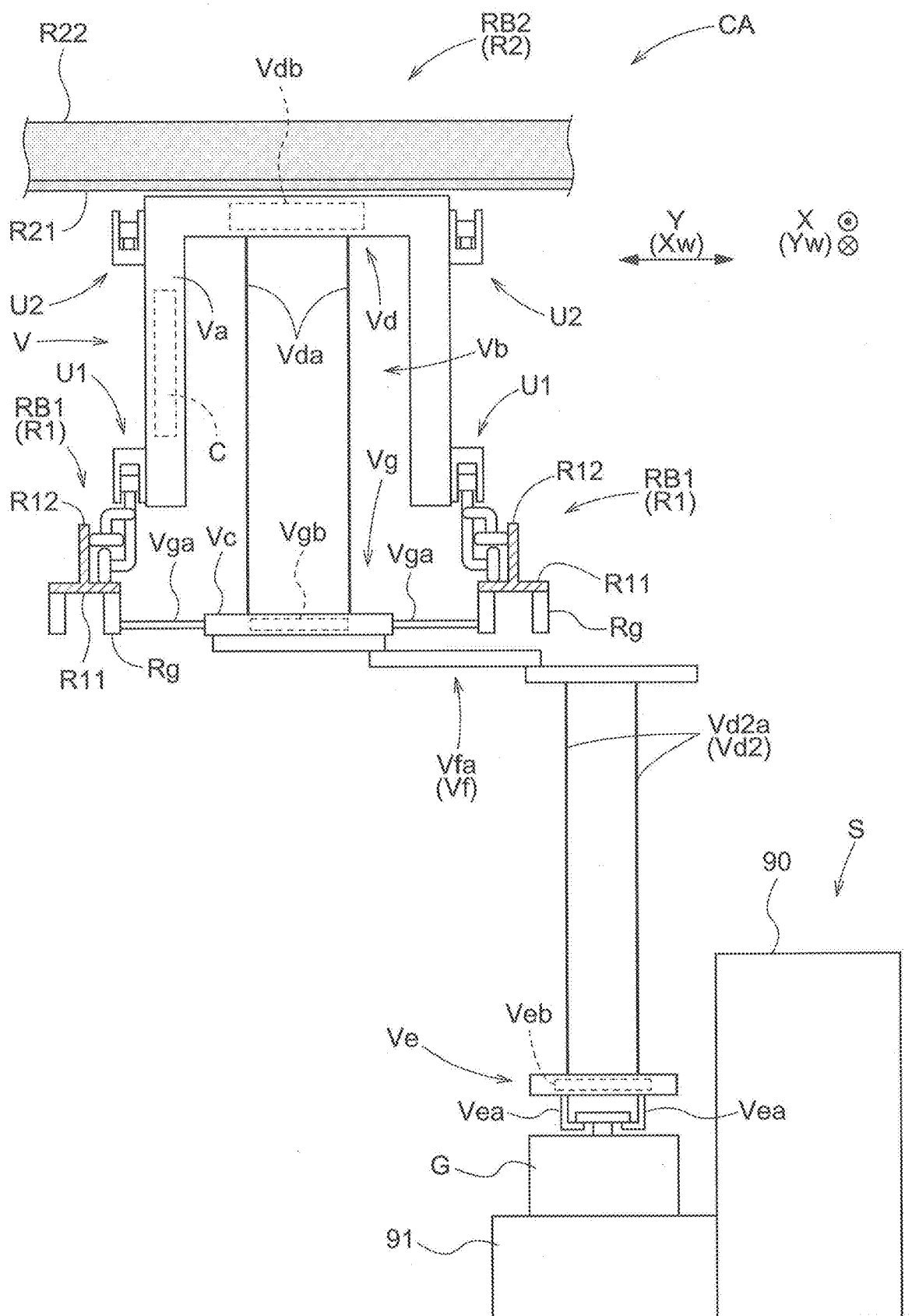
FIG. 4 is an illustrative diagram of a case where a transfer operation is performed with respect to a transfer target location.
Figure 5:
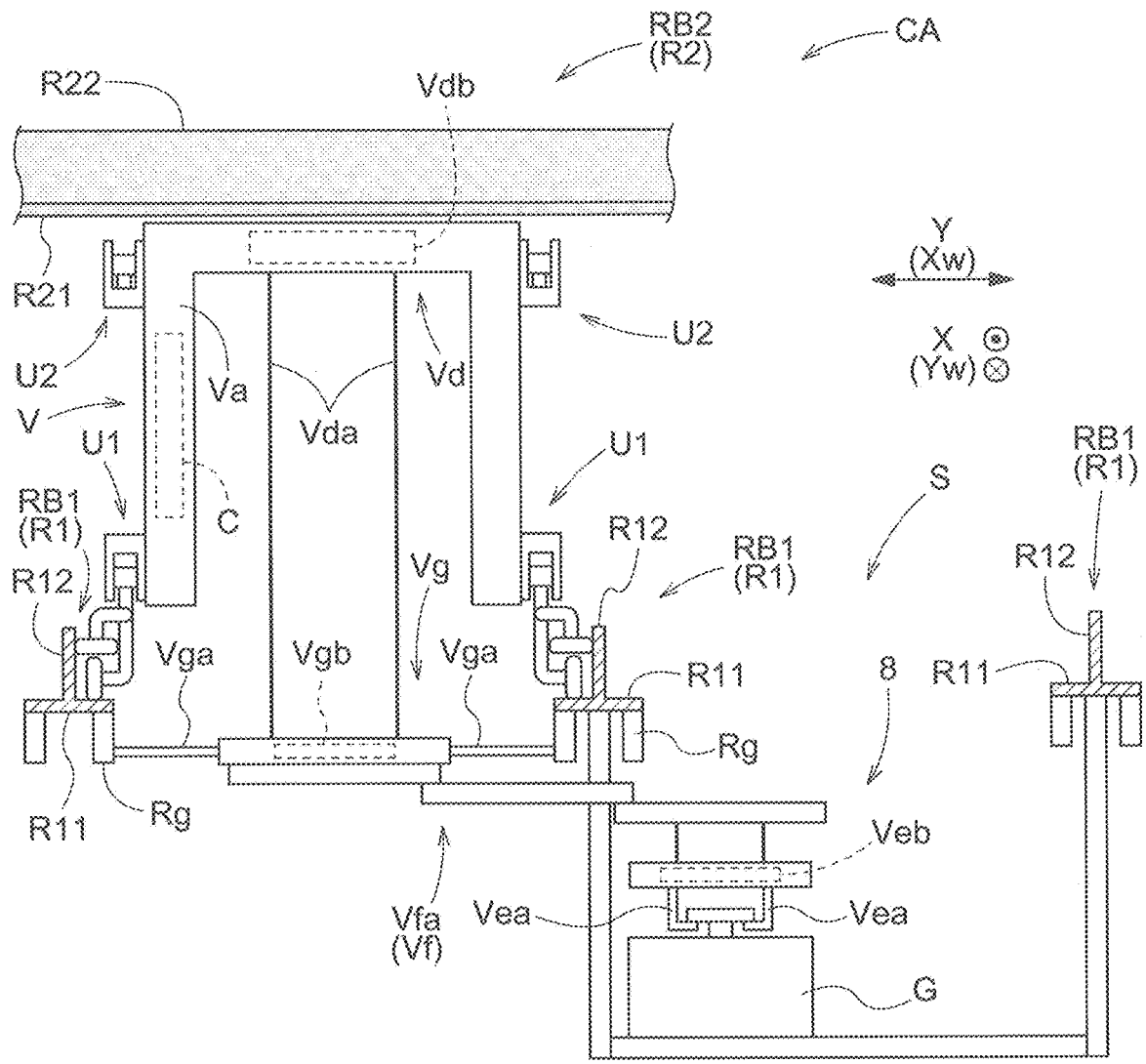
FIG. 5 is an illustrative diagram of a case where a transfer operation is performed with respect to a storage shelf.

In the present embodiment, the location where the article G is transferred to and from the transport vehicle V is a transfer target location S, and the article transport facility 100 includes a plurality of transfer target locations S (see FIGS. 4 and 5). As shown in FIG. 4, the transfer target location S includes a mounting platform 91. The article G is transported to the mounting platform 91 for a specific purpose. This particular purpose differs depending on the type and state of the article G, and the like. Also, as shown in FIG. 5, the article transport facility 100 includes a storage shelf 8 capable of holding the article G. In this example, the transfer target location S also includes this storage shelf 8. The storage shelf 8 is provided at an intermediate position on the route along which the article G is transported. As a result, the article G can be temporarily or long-term stored on the storage shelf 8 while the article G is being transported by the transport vehicle V. Note that although detailed illustration is omitted, the transfer target location S includes, for example, a conveyor for entering and leaving an article storeroom.

The article transport facility 100 is used, for example, in a semiconductor manufacturing factory. As shown in FIG. 4, in the present embodiment, the article transport facility 100 includes a processing apparatus 90 that processes the article G, and the above-described mounting platform 91 is arranged adjacent to the processing apparatus 90.

In this embodiment, the transport vehicle V transports the article G that has not yet been processed by the processing apparatus 90 to the mounting platform 91, and transports the article G that has been processed by the processing apparatus 90 from the mounting platform 91 to a specified transport destination. For example, the article G is a container that contains a processing target object to be processed by the processing apparatus 90, and the above-mentioned "processing performed on the article G" means processing performed on the processing target object contained in the article G.

Examples of the article G include a wafer accommodating container for accommodating a wafer (a so-called FOUP: Front Opening Unified Pod) and a reticle accommodating container for accommodating a reticle (a so-called reticle pod). If the article G is a FOUP, the processing target object is a wafer. If the article G is a reticle pod, the processing target object is a reticle. In the semiconductor manufacturing factory illustrated here, the processing apparatus 90 performs various processes such as thin film formation, photolithography, and etching on a semiconductor substrate.

As shown in FIGS. 2 and 3, the second rail R2 is spaced upward from the first rail R1 and intersects the first rail R1 in a view in an up-down direction. That is, the first rail R1 and the second rail R2 are disposed at different positions in the up-down direction. As a result, the travel route along the first rail R1 and the travel route along the second rail R2 can be disposed in different horizontal planes while intersecting each other in a view in the up-down direction.

According to this configuration, the first rail R1 and the second rail R2 are not connected to each other, and therefore there is no seam between the first rail R1 and the second rail R2. Accordingly, since there is no level difference resulting from the presence of a seam, it is possible to prevent vibration from occurring when the transport vehicle V travels through the portion where both rails (R1, R2) intersect each other. Also, since the first rail R1 and the second rail R2 are physically separated from each other, the first rail R1 and the second rail R2 can be installed at different times.

Accordingly, it is possible to ensure a degree of freedom in the task when installing the travel route constituted by the first rail R1 and the second rail R2 in the article transport facility 100.

As shown in FIG. 1, in the present embodiment, the article transport facility 100 has an intersection area CA where the travel route along the first rail R1 and the travel route along the second rail R2 intersect each other. In this example, the first rail R1 and the second rail R2 are orthogonal in a view in the up-down direction. The plurality of first rails R1 are disposed side by side in the direction (first width direction Xw, second direction Y) orthogonal to the first direction X in a view in the up-down direction, and the plurality of second rails R2 are disposed side by side in the direction (second width direction Yw, first direction X) orthogonal to the second direction Y in a view in the up-down direction. As a result, in this example, a travel route in which the plurality of first rails R1 and the plurality of second rails R2 form a lattice in a view in the up-down direction is provided in the intersection area CA.

As described above, the first rail R1 includes the first travel surfaces Fr1 on which the transport vehicle V travels along the first direction X. As shown in FIGS. 2 and 3, in the present embodiment, the first rail R1 includes first guide surfaces Fg1 facing a direction (in this example, the second direction Y) orthogonal to the first direction X in a view in the up-down direction. In other words, the first rail R1 includes the first guide surfaces Fg1 facing the first width direction Xw. The first guide surfaces Fg1 are surfaces for guiding the transport vehicle V along the first direction X.

Also, as described above, the second rail R2 includes the second travel surfaces Fr2 on which the transport vehicle V travels along the second direction Y. In this embodiment, the second rail R2 includes second guide surfaces Fg2 that face a direction (in this example, the first direction X) orthogonal to the second direction Y in a view in an up-down direction. In other words, the second rail R2 includes the second guide surfaces Fg2 facing the second width direction Yw.
The second guide surfaces Fg2 are surfaces for guiding the transport vehicle V along the second direction Y.

As shown in FIG. 2, in this embodiment, the first rail R1 includes a pair of first rail bodies RB1 spaced apart in a first width direction Xw. In this example, each of the plurality of first rails R1 disposed side by side in the first width direction Xw includes a pair of first rail bodies RB1 spaced apart in the first width direction Xw. That is, one first rail R1 is constituted by a pair of first rail bodies RB1 spaced apart in the first width direction Xw, and a plurality of first rails R1 are disposed side by side in the first width direction Xw.

In the present embodiment, two first rails R1 adjacent to each other in the first width direction Xw share one first rail body RB1, and the first rail body RB1 has a pair of first travel surfaces Fr1 formed thereon that respectively belong to the two first rails R1 adjacent to each other in the first width direction Xw. As a result, the number of first rail bodies RB1 to be installed can be reduced in the entire facility. Accordingly, it is easy to reduce the number of man-hours when installing the first rails R1.

In the present embodiment, the first rail body RB1 includes a first main body portion R11 extending along the first direction X, and a first wall portion R12 that protrudes upward from the first main body portion R11 and extends along the first direction X. The first travel surfaces Fr1 are formed by the upward-facing surface of the first main body portion R11. In this example, the first travel surfaces Fr1 are disposed on both sides of the first wall portion R12 in the first width direction Xw. The first guide surfaces Fg1 are formed by surfaces of the first wall portion R12 facing both sides in the first width direction Xw.

With the above-described configuration, it is possible to cause both the transport vehicle V that travels on one side of the first wall portion R12 in the first width direction Xw and the other transport vehicle V that travels on the other side of the first wall portion R12 in the first width direction Xw to appropriately travel using the pair of first travel surfaces Fr1 included on one first rail body RB1, and it is possible to appropriately guide both of the transport vehicles V using the pair of first guide surfaces Fg1 included on one first rail body RB1. In this example, the cross-section of the first rail body RB1 orthogonal to the first direction X is in an inverted T shape.

As shown in FIG. 3, in the present embodiment, the second rail R2 includes a pair of second rail bodies RB2 spaced apart in the second width direction Yw. In this example, each of the plurality of second rails R2 disposed side by side in the second width direction Yw includes a pair of second rail bodies RB2 spaced apart in the second width direction Yw. That is, one second rail R2 is constituted by a pair of second rail bodies RB2 spaced apart in the second width direction Yw, and a plurality of second rails R2 are disposed side by side in the second width direction Yw.

In the present embodiment, two second rails R2 adjacent to each other in the second width direction Yw share one second rail body RB2, and a pair of second travel surfaces Fr2 that respectively belong to the two rails R2 adjacent to each other in the second width direction Yw are formed on the second rail body RB2. This makes it possible to reduce the number of second rail bodies RB2 to be installed in the entire facility. Accordingly, it is easy to reduce the number of man-hours when installing the second rails R2.

In the present embodiment, the second rail body RB2 includes a second main body portion R21 extending along the second direction Y, and a second wall portion R22 that protrudes upward from the second main body portion R21 and extends along the second direction Y. The second travel surfaces Fr2 are formed by the upward-facing surface of the second main body portion R21. In this example, the second travel surfaces Fr2 are disposed on both sides of the second wall portion R22 in the second width direction Yw. The second guide surfaces Fg2 are formed by surfaces of the second wall portion R22 facing both sides in the second width direction Yw.

With the above-described configuration, it is possible to cause both the transport vehicle V that travels on one side of the second wall portion R22 in the second width direction Yw and the other transport vehicle V that travels on the other side of the second wall portion R22 in the second width direction Yw to appropriately travel using the pair of second travel surfaces Fr2 included on one second rail body RB2, and it is possible to appropriately guide both of the transport vehicles V using the pair of second guide surfaces Fg2 included on one second rail body RB2. In this example, the cross-section of the second rail body RB2 orthogonal to the second direction Y is in an inverted T shape.

As shown in FIGS. 2 and 3, the transport vehicle V includes a vehicle body Va, a first traveling unit U1 that causes the vehicle body Va to travel along the first direction X, a second traveling unit U2 that causes the vehicle body Va to travel along the second direction Y, and a control unit C that controls the operations of the first traveling unit U1 and the second traveling unit U2. The vehicle body Va is disposed between the first rail R1 and the second rail R2 in the up-down direction. Specifically, the vehicle body Va is disposed between an upper end of the first rail body RB1 (an upper end of the first wall portion R12) and a lower end of the second rail body RB2 (the lower end of the second main body portion R21) in the up-down direction.

In this embodiment, the transport vehicle V includes an accommodation portion Vb that accommodates the article G during travel. The accommodation portion Vb is provided in the vehicle body Va. In this example, the transport vehicle V includes an elevating body Vc coupled to the vehicle body Va, an elevating apparatus Vd that raises and lowers the elevating body Vc relative to the vehicle body Va, and a holding section Ve that is supported by the elevating body Vc and holds the article G.

In this embodiment, the vehicle body Va has a shape that covers the article G accommodated in the accommodation portion Vb from a plurality of directions. In this example, the vehicle body Va has a shape that covers the upper side and both sides in the second direction Y of the article G accommodated in the accommodation portion Vb. For this reason, the lower side and both sides in the first direction X of the article G accommodated in the accommodation portion Vb are open. These open portions are used when the article G is transferred to and from the mounting platform 91 or the storage shelf 8. The details of the transfer of the article G will be described later.

The first traveling unit U1 includes a first wheel 11 and a first orientation changing mechanism 13 that changes the orientation of the first wheel 11 relative to the vehicle body Va, and the first traveling unit U1 performs an orientation change between a first wheel placement orientation, in which the first wheel 11 is placed on the first travel surface Fr1, and a first wheel retraction orientation, in which the first wheel 11 is separated from the first travel surface Fr1. In this embodiment, the first wheel 11 is rotationally driven. As a result, a propulsive force by which the vehicle body Va travels along the first direction X is generated. Note that FIG. 2 shows the first wheel placement orientation of the first traveling unit U1. FIG. 3 shows the first wheel retraction orientation of the first traveling unit U1.

In this embodiment, the first traveling unit U1 includes a first guide wheel 12 guided by the first guide surface Fg1. The first guide wheel 12 is in contact with the first guide surface Fg1 while the first traveling unit U1 is in the first wheel placement orientation, and is separated from the first guide surface Fg1 while the first traveling unit U1 is in the first wheel retraction orientation. With such a configuration, when the first traveling unit U1 causes the vehicle body Va to travel along the first rail R1 in the first wheel placement orientation, the first guide wheel 12 can appropriately guide the vehicle body Va along the first rail R1.

In the present embodiment, while the first traveling unit U1 is in the first wheel placement orientation, the first wheel 11 is placed on the first travel surface Fr1 with the rotation axis of the first wheel 11 directed in the first width direction Xw (the second direction Y). Also, while the first traveling unit U1 is in the first wheel placement orientation, the first guide wheel 12 is in contact with the first guide surface Fg1 with the rotation axis of the first guide wheel 12 directed in the up-down direction.

In this embodiment, the transport vehicle V includes a plurality of first traveling units U1. The transport vehicle V travels along the first rail R1 using the plurality of first traveling units U1. As described above, the first rail R1 on which the transport vehicle V travels along the first direction X includes the pair of first rail bodies RB1 spaced apart in the first width direction Xw. In this embodiment, the first traveling units U1 are provided corresponding to the pair of first rail bodies RB1 spaced apart in the first width direction Xw. Also, in this example, the pair of first traveling units U1 are separated from each other in the first direction X on the two side portions of the vehicle body Va in the first width direction Xw (second direction Y) (see FIG. 3). That is, in this example, the transport vehicle V includes a total of four first traveling units U1.

The second traveling unit U2 includes a second wheel 21 and a second orientation changing mechanism 23 that changes the orientation of the second wheels 21 relative to the vehicle body Va, and the second traveling unit U2 performs an orientation change between a second wheel placement orientation, in which the second wheel 21 is placed on the second travel surface Fr2, and a second wheel retraction orientation, in which the second wheel 21 is separated from the second travel surface Fr2. In this embodiment, the second wheel 21 is rotationally driven. As a result, a propulsive force for causing the vehicle body Va to travel along the second direction Y is generated. Note that FIG. 2 shows the second wheel retraction orientation of the second traveling unit U2. FIG. 3 shows the second wheel placement orientation of the second traveling unit U2.

As shown in FIG. 3, in this embodiment, the second traveling unit U2 includes a second guide wheel 22 guided by the second guide surface Fg2. The second guide wheel 22 is in contact with the second guide surface Fg2 while the second traveling unit U2 is in the second wheel placement orientation, and is separated from the second guide surface Fg2 while the second traveling unit U2 is in the second wheel retraction orientation. With such a configuration, when the second traveling unit U2 causes the vehicle body Va to travel along the second rail R2 in the second wheel placement orientation, the second guide wheel 22 can appropriately guide the vehicle body Va along the second rail R2.

In the present embodiment, while the second traveling unit U2 is in the second wheel placement orientation, the second wheel 21 is placed on the second travel surface Fr2 with the rotation axis of the second wheel 21 directed in the second width direction Yw (first direction X). Also, while the second traveling unit U2 is in the second wheel placement orientation, the second guide wheel 22 is in contact with the second guide surface Fg2 with the rotation axis of the second guide wheel 22 directed in the up-down direction.

In this embodiment, the transport vehicle V includes a plurality of second traveling units U2. The transport vehicle V travels along the second rail R2 using the plurality of second traveling units U2. As described above, the second rail R2 on which the transport vehicle V travels along the second direction Y includes a pair of second rail bodies RB2 spaced apart in the second width direction Yw. In this embodiment, the second traveling units U2 are provided so as to respectively correspond to the pair of second rail bodies RB2 spaced apart in the second width direction Yw. Also, in this example, a pair of second traveling units U2 are separated from each other in the first direction X on both side portions of the vehicle body Va in the first width direction Xw (second direction Y) (see FIG. 3). That is, in this example, the transport vehicle V has a total of four second traveling units U2.

The control unit C can change in mode between a first mode of causing the vehicle body Va to travel along the first rail R1 with the first traveling units U1 in the first wheel placement orientation and the second traveling units U2 in the second wheel retraction orientation, and a second mode of causing the vehicle body Va to travel along the second rail R2 with the second traveling units U2 in the second wheel placement orientation and the first traveling units U1 in the first wheel retraction orientation. FIG. 2 shows a state in which the control unit C is executing the first mode. FIG. 3 shows a state in which the control unit C is executing the second mode.

In the present embodiment, before changing between the first mode and the second mode, the control unit C is in a double-supported state in which the vehicle body Va is supported by both the first rail R1 and the second rail R2 with the first traveling units U1 in the first wheel placement orientation and the second traveling units U2 in the first wheel placement orientation. When the first mode is to be executed, the control unit C changes the second traveling units U2 from the double-supported state to the second wheel retraction orientation. Also, when the second mode is to be executed, the control unit C changes the first traveling units U1 from the double-supported state to the first wheel retraction orientation. With such a configuration, the mode can be changed while appropriately supporting the vehicle body Va. Note that the mode change between the first mode and the second mode is executed while the vehicle body Va is at the intersection location where the first rail R1 and the second rail R2 intersect in a view in the up-down direction.

In the present embodiment, the first wheels 11 and the first guide wheels 12 are above the first rail R1 while the first traveling units U1 are in the first wheel retraction orientation (see FIG. 3). As a result, when the control unit C executes the second mode and the transport vehicle V travels along the second direction Y, the first wheels 11 and the first guide wheels 12 can be prevented from interfering with the first rail R1. Accordingly, it is possible to cause the transport vehicle V to travel appropriately along the second direction Y.

In the present embodiment, when the second traveling units U2 is in the second wheel retraction orientation, the second wheels 21 and the second guide wheels 22 are below the second rail R2 (see FIG. 2). As a result, when the control unit C executes the first mode and the transport vehicle V travels along the first direction X, the second wheels 21 and the second guide wheels 22 can be prevented from interfering with the second rail R2. Accordingly, it is possible to cause the transport vehicle V to travel appropriately along the first direction X.

In the present embodiment, the first orientation changing mechanism 13 includes a first support arm 131 that is swingably coupled to the vehicle body Va and supports the first wheel 11, and a first drive unit 132 that drives the first support arm 131.

In this embodiment, the first support arm 131 supports the first guide wheel 12 in addition to the first wheel 11. The first support arm 131 rotatably supports both the first wheel 11 and the first guide wheel 12 such that the rotation axis of the first wheel 11 and the rotation axis of the first guide wheel 12 extend along different directions. More specifically, the first support arm 131 supports the first wheel 11 and the first guide wheel 12 such that the direction along the rotation axis of the first wheel 11 and the direction along the rotation axis of the first guide wheel 12 are orthogonal to each other.

In this embodiment, the first drive unit 132 swings the first support arm 131 about a first swing axis Ax1 extending in the second direction Y to change the orientation of the first wheel 11 relative to the vehicle body Va. In this example, the first drive unit 132 also changes the orientation of the first guide wheel 12 relative to the vehicle body Va by swinging the first support arm 131 about the first swing axis Ax1. The first drive unit 132 includes, for example, a motor.

In this embodiment, the positions of the first wheels 11 and the first guide wheels 12 (indicated by the solid lines in FIG. 3) when the first traveling units U1 are in the first wheel retraction orientation are arranged toward the center of the vehicle body Va in the first direction X relative to the positions of the first wheels 11 and the first guide wheels 12 when the first traveling units U1 are in the first wheel placement orientation (indicated by the broken lines in FIG. 3). In this example, the first wheels 11 and the first guide wheels 12 when the first traveling units U1 are in the first wheel retraction orientation are at positions overlapping with the vehicle body Va in a view in the second direction Y. This makes it easier to reduce the size of the transport vehicle V in the first direction X when the first traveling units U1 are in the first wheel retraction orientation.

In this embodiment, the second orientation changing mechanism 23 includes a second support arm 231 that is swingably coupled to the vehicle body Va and supports the second wheel 21, and a second drive unit 232 that drives the second support arm 231.

In this embodiment, the second support arm 231 supports the second guide wheel 22 in addition to the second wheel 21. The second support arm 231 rotatably supports both the second wheel 21 and the second guide wheel 22 such that the rotation axis of the second wheel 21 and the rotation axis of the second guide wheel 22 extend in different directions. More specifically, the second support arm 231 supports the second wheel 21 and the second guide wheel 22 such that the direction along the rotation axis of the second wheel 21 and the direction along the rotation axis of the second guide wheel 22 are orthogonal to each other.

In the present embodiment, the second drive unit 232 swings the second support arm 231 about a second swing axis Ax2 extending in the second direction Y to change the orientation of the second wheel 21 relative to the vehicle body Va. In this example, the second drive unit 232 also changes the orientation of the second guide wheel 22 relative to the vehicle body Va by swinging the second support arm 231 about the second swing axis Ax2. The second drive unit 232 includes, for example, a motor.

In the present embodiment, the positions of the second wheels 21 and the second guide wheels 22 when the second traveling units U2 are in the second wheel retraction orientation (indicated by the broken lines in FIG. 3) are closer to the center of the vehicle body Va in the first direction X relative to the positions of the second wheels 21 and the second guide wheels 22 when the second traveling units U2 are in the second wheel placement orientation (indicated by the solid lines in FIG. 3). In this example, the second wheels 21 and the second guide wheels 22 when the second traveling units U2 are in the second wheel retraction orientation are at positions overlapping with the vehicle body Va in a view in the second direction Y. This makes it easier to reduce the size of the transport vehicle V in the first direction X when the second traveling unit U2 is in the second wheel retraction orientation.

As shown in the partially-enlarged view of FIG. 3, in the present embodiment, when the second orientation changing mechanism 23 changes the orientation of the second traveling unit U2 from the second wheel retraction orientation to the second wheel placement orientation, the second wheel 21 is placed on the second travel surface Fr2 at a position past an uppermost position Pt of a movement path along which the second wheel 21 due to swinging of the second support arm 231. This makes it possible to place the second wheel 21 on the second travel surface Fr2 by approaching the second travel surface Fr2 from above. Accordingly, when the orientation is changed from the second wheel retraction orientation to the second wheel placement orientation, the orientation can be appropriately changed while reducing friction between the second wheel 21 and the second travel surface Fr2. By doing so, wearing of the second wheel 21 and the generation of dust can be suppressed.

With the configuration described above, it is possible to cause the transport vehicle V to travel in the first direction X along the first rail R1 and to cause the transport vehicle V to travel in the second direction Y along the second rail R2.

Next, the configuration by which the transport vehicle V transfers the article G will be described mainly with reference to FIGS. 4 and 5.

As described above, in the present embodiment, the transport vehicle V includes the elevating body Vc coupled to the vehicle body Va, the elevating apparatus Vd that raises and lowers the elevating body Vc relative to the vehicle body Va, and the holding section Ve that is supported by the elevating body Vc and holds the article G, and the transport vehicle V transfers the article G to and from the mounting platform 91 and the storage shelf 8.

In this embodiment, the elevation apparatus Vd includes a belt Vda coupled to the elevating body Vc, and an elevation drive unit Vdb that drives the belt Vda. Although detailed illustration is omitted, the elevation drive unit Vdb includes a pulley around which the belt Vda is wound, and a motor that rotationally drives the pulley.

In this embodiment, the holding section Ve performs an orientation change between a holding orientation, in which the article G is held, and a release orientation, in which the article G is released. In this example, the holding section Ve includes a pair of holding claws Vea that approach or separate from each other, and a holding drive unit Veb that drives the pair of holding claws Vea. The pair of holding claws Vea enter the holding orientation by approaching each other, and enter the holding release orientation by separating from each other.

In this embodiment, the elevation apparatus Vd raises and lowers the elevating body Vc between the pair of first rail bodies RB1 in the first width direction Xw in a view in the up-down direction. In this example, the control unit C allows the elevating apparatus Vd to raise and lower the lifting body Vc during execution of the first mode.

To add further description, when the control unit C is executing the first mode, the vehicle body Va is disposed between the pair of first rail bodies RB1 in the first width direction Xw in a view in the up-down direction. That is, when the control unit C is executing the first mode, the elevating body Vc is disposed at a position that does not overlap with the first rail body RB1 in a view in the up-down direction. In this case, the elevating body Vc can be raised and lowered without interfering with the first rail body RB1.

Here, it is preferable that the control unit C prohibits the raising and lowering of the lifting body Vc by the lifting device Vd during execution of the second mode. To add further description, when the control unit C is executing the second mode, the position of the elevating body Vc in the second direction Y is determined according to the current position of the vehicle body Va traveling along the second rail R2. For this reason, the first rail body RB1 can be disposed directly below the elevating body Vc. If the elevating body Vc is lowered in this state, the elevating body Vc and the first rail body RB1 interfere with each other. However, by prohibiting the raising and lowering of the elevating body Vc by the lifting device Vd during the execution of the second mode, the control unit C can avoid such a situation where the elevating body Vc and the first rail body RB1 interfere with each other. Note that even during execution of the second mode, the raising and lowering of the elevating body Vc by the lifting device Vd may also be permitted on the condition that the first rail body RB1 is not arranged directly below the elevating body Vc. In this case, it is possible to confirm that the first rail body RB1 is not disposed directly below the elevating body Vc by detecting the position of the first rail body RB1 relative to the vehicle body Va with use of a sensor, for example.

The transport vehicle V further includes a slide apparatus Vf that slides the holding portion Ve along the horizontal direction relative to the elevating body Vc, and an engaging apparatus Vg that is supported by the elevating body Vc.

In this embodiment, the slide apparatus Vf includes a slide body Vfa that supports the holding section Ve and extends and retracts along the horizontal direction, and a slide drive unit (not shown) that drives the slide body Vfa to extend and retract. By extending and retracting the slide body Vfa, the holding section Ve supported by the slide body Vfa can be displaced in the horizontal direction. In this embodiment, the slide apparatus Vf slides the holding section Ve along the second direction Y. As a result, as shown in FIG. 4, even if the mounting platform 91 is disposed at a position shifted in the first width direction Xw (second direction Y) relative to the first rail R1, it is possible to appropriately transfer the article G to and from the mounting platform 91. Also, as shown in FIG. 5, in this embodiment, the storage shelf 8 is disposed at a position shifted in the first width direction Xw (second direction Y) relative to the first rail R1. Accordingly, the slide apparatus Vf can appropriately transfer the article G to and from such a storage shelf 8. Note that the storage shelf 8 is supported by the first rail R1 below the first rail R1. In the illustrated example, the storage shelf 8 is supported by a pair of first rail bodies RB1 belonging to another first rail R1 adjacent in the first width direction Xw (second direction Y) to the first rail R1 on which the transport vehicle V is present.

In this embodiment, the transport vehicle V further includes a second elevating apparatus Vd2 that raises and lowers the holding section Ve relative to the slide apparatus Vf, below the slide apparatus Vf. The elevating apparatus Vd and the second elevating apparatus Vd2 are different apparatuses. The elevating apparatus Vd may also be referred to as a "first elevating apparatus Vd" to distinguish it from the second elevating apparatus Vd2.

If the maximum elevation range in which the elevating apparatus Vd can raise and lower the elevating body Vc is a first elevation range and the maximum elevation range in which the second elevating apparatus Vd2 can raise and lower the holding section Ve is a second elevation range, in the present embodiment, the first elevation range and the second elevation range are different from each other. In this example, the first elevation range is shorter than the second elevation range. That is, the range in which the elevating body Vc can be raised and lowered is shorter than the range in which the holding section Ve can be raised and lowered.

In this embodiment, the second elevating apparatus Vd2 includes a belt Vd2a coupled to the holding section Ve, and an elevation drive unit (not shown) that drives the belt Vd2a. Although detailed illustration is omitted, the elevation drive unit of the second elevating apparatus Vd2 includes a pulley around which the belt Vd2a is wound, and a motor that rotationally drives the pulley.

Here, the first rail R1 has an engaged portion Rg. In the present embodiment, the engaged portion Rg is disposed at a position corresponding to the transfer target location S in the first direction X. In this example, the engaged portion Rg is disposed at a position corresponding to the mounting platform 91 in the first direction X and a position corresponding to the storage shelf 8 in the first direction X.

The engaged portion Rg is provided on at least one of the pair of first rail bodies RB1. In this embodiment, the engaged portions Rg are provided on both of the pair of first rail bodies RB1. The engaged portions Rg provided on the pair of first rail bodies RB1 are disposed at the same position in the first direction X. Specifically, the engaged portions Rg provided on the pair of first rail bodies RB1 are disposed at the same position in the first direction X and the up-down direction.

In other words, the engaged portions Rg provided on the pair of first rail bodies RB1 face each other in the second direction Y.

In this embodiment, the engaged portions Rg are fixed to the first rail R1, below the first travel surfaces Fr1. Specifically, the engaged portions Rg are fixed to the pair of first rail bodies RB1 spaced apart in the first width direction Xw. The engaged portions Rg are provided so as to protrude downward from the first rail bodies RB1.

Figure 6:
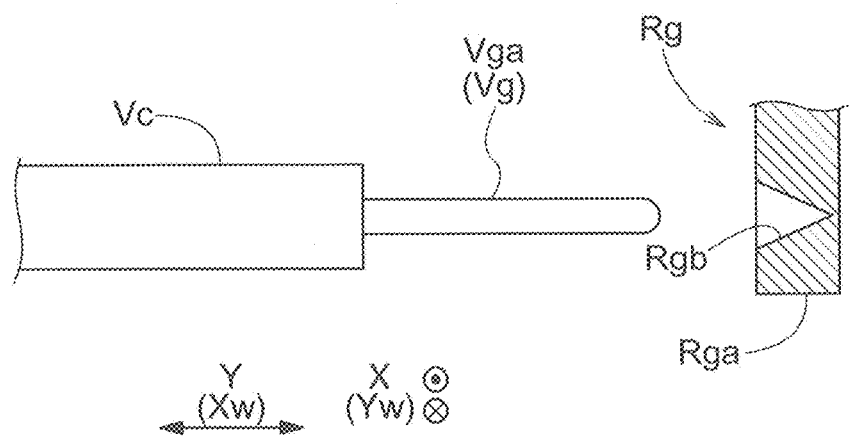
FIG. 6 is a diagram showing a structure of an engaging portion and an engaged portion.

As shown in FIG. 6, in the present embodiment, the engaged portion Rg includes a block portion Rga in a block shape and an engaged hole Rgb formed in the block portion Rga. The engaged hole Rgb is open to the surface of the block portion Rga facing inward in the first width direction Xw (second direction Y). In this example, the engaged hole Rgb is formed such that the opening area narrows from the inner side in the first width direction Xw (second direction Y) toward the outer side in the first width direction Xw (second direction Y). In the illustrated example, the engaged hole Rgb is formed in a conical shape.

As shown in FIGS. 4 and 5, the engaging apparatus Vg is supported by the elevating body Vc. The engaging apparatus Vg includes an engaging portion Vga that engages with the engaged portion Rg, and an engagement drive unit Vgb that changes the orientation of the engaging portion Vga between an engagement orientation and a release orientation.

In this embodiment, the engaging apparatus Vg has a pair of engaging portions Vga. The pair of engaging portions Vga protrude outward in the first width direction Xw (second direction Y) relative to the elevating body Vc in at least the engagement orientation. In this example, each of the pair of engaging portions Vga is formed in a bar shape and is supported by the elevating body Vc in an orientation extending along the first width direction Xw (second direction Y). In this example, the leading end of each of the pair of engaging portions Vga is formed so as to taper toward the outer side (toward the engaged hole Rgb) in the first width direction Xw (the second direction Y). In the illustrated example, the leading end of the engaging portion Vga is formed in a hemispherical shape.

The engagement drive unit Vgb moves the engaging portion Vga back and forth along the first width direction Xw (the second direction Y), thereby changing the orientation of the engaging portion Vga between the engagement orientation and the release orientation. In this example, the engagement drive unit Vgb changes the orientation of the pair of engaging portions Vga. The engagement drive unit Vgb preferably includes, for example, a known mechanism such as a ball screw mechanism or a link mechanism for moving an object (the engaging portion Vga).

In the engagement orientation, the engaging portion Vga engages with the engaged portion Rg to restrict raising, lowering, and tilting of the elevating body Vc, and in the release orientation, the engaging portion Vga is separated from the engaged portion Rg to allow raising and lowering of the elevating body Vc. FIGS. 4 and 5 show the engagement orientation of the engaging portion Vga. Note that FIG. 2 shows the release orientation of the engaging portion Vga.

The control unit C sets the engaging portion Vga to the release orientation when the elevating apparatus Vd is to raise or lower the elevating body Vc, and sets the engaging portion Vga to the engagement orientation when the slide apparatus Vf is to cause the holding section Ve to protrude from the elevating body Vc in the horizontal direction. In the present embodiment, the control unit C sets the engaging portion Vga to the engagement orientation, and causes the holding section Ve to protrude in the first width direction Xw (the second direction Y) relative to the elevating body Vc by the slide apparatus Vf, or causes the holding section Ve to retract in the first width direction Xw (second direction Y) relative to the elevating body Vc. With the above configuration, when the article G is transferred to a position shifted in the horizontal direction from directly below the transport vehicle V, tilting of the elevating body Vc can be restricted by setting the engaging portion Vga to the engagement orientation. As a result, it is possible to appropriately transfer the article G to a position shifted in the horizontal direction from directly below the transport vehicle V. Note that the engaging portion Vga also positions the elevating body Vc in the first direction X in the engagement orientation. Accordingly, when the article G is transferred to and from the mounting platform 91 or the storage shelf 8, positioning in the first direction X can also be easily performed.

In this embodiment, the transport vehicle V can execute a delivery operation of delivering the article G to the mounting platform 91 and a receiving operation of receiving the article G from the mounting platform 91 by sliding the holding section Ve with the slide apparatus Vf.

As shown in FIG. 4, when causing the transport vehicle V to deliver the article G to the mounting platform 91, the control unit C lowers the elevating body Vc with the elevating apparatus Vd and sets the engaging portion Vga to the engagement orientation. Then, the control unit C causes the holding section Ve to protrude in the first width direction Xw (the second direction Y) relative to the elevating body Vc with the slide apparatus Vf, and disposes the holding section Ve directly above the mounting platform 91. Thereafter, the control unit C lowers the holding section Ve with the second elevating apparatus Vd2 and places the article G on the mounting platform 91 with the holding section Ve in the release orientation. When the control unit C causes the transport vehicle V to perform the operation of receiving the article G from the mounting platform 91, the control unit C causes the apparatuses to perform operations opposite to those described above.

Note that if the mounting platform 91 is not disposed at a position shifted in the first width direction Xw (second direction Y) relative to the first rail R1, but at a position overlapping with the first rail R1 in a view in the up-down direction (immediately below the transport vehicle V), there is no need to slide the holding section Ve with the slide apparatus Vf. In this case, the control unit C transfers the article G to and from the mounting platform 91 disposed directly below the transport vehicle V by operating at least one of the elevating apparatus Vd and the second elevating apparatus Vd2. In this case, depending on the situation, the engagement portion Vga may be in the engagement orientation or in the release orientation.

As described above, the transport vehicle V transfers the article G to and from the storage shelf 8 in addition to the mounting platform 91. That is, in the present embodiment, the transport vehicle V can execute the delivery operation of delivering the article G to the storage shelf 8 and the receiving operation of receiving the article G from the storage shelf 8 by sliding the holding section Ve with the slide apparatus Vf.

As shown in FIG. 5, when the transport vehicle V is to perform a delivery operation or a receiving operation of the article G to or from the storage shelf 8, the control unit C causes the elevating apparatus Vd to raise the elevating body Vc to a height corresponding to the storage shelf 8 and sets the engaging portion Vga to the engagement orientation. In the present embodiment, when the transport vehicle V is to execute a delivery operation of the article G to the storage shelf 8, the control unit C lowers the elevating body Vc with the elevating apparatus Vd and sets the engagement portion Vga to the engagement orientation. Then, the control unit C causes the holding section Ve to protrude in the first width direction Xw (the second direction Y) relative to the elevating body Vc with the slide apparatus Vf, and disposes the holding section Ve directly above the storage shelf 8. Thereafter, the control unit C lowers the holding section Ve with the second elevating apparatus Vd2 and places the article G on the storage shelf 8 with the holding section Ve in the release orientation. When the transport vehicle V is to execute the reception operation of the article G from the storage rack 8, the control unit C causes each apparatus to perform an operation opposite to that described above.

Second Embodiment

Next, a second embodiment of the article transport facility 100 will be described with reference to FIGS. 7 and 8. Differences from the first embodiment will be mainly described below. Points that are not particularly described are the same as those of the first embodiment.

Figure 7:
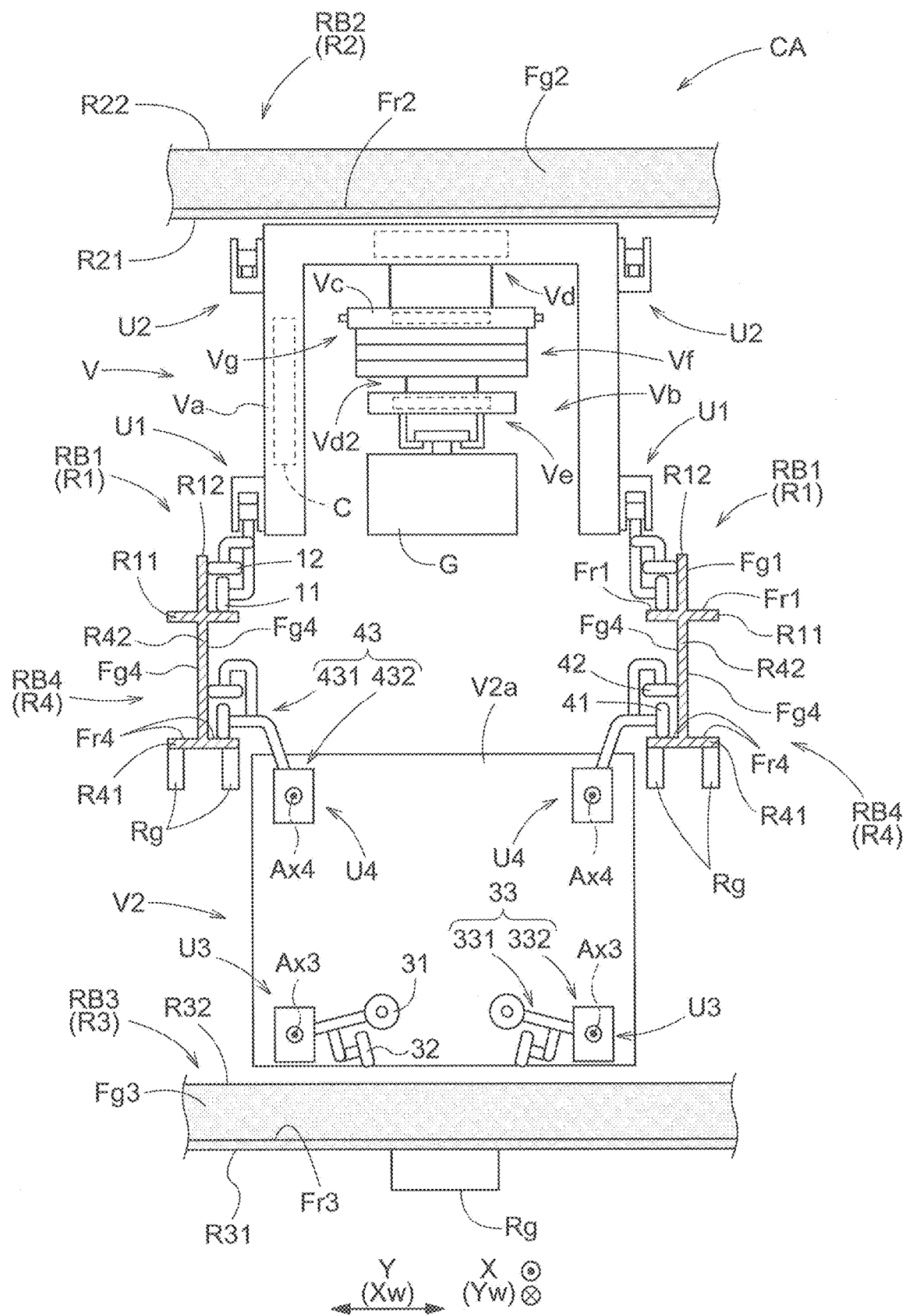
FIG. 7 is a view in a first direction showing a state in which the transport vehicle is executing the first mode and a second transport vehicle is executing a fourth mode in a second embodiment.
Figure 8:
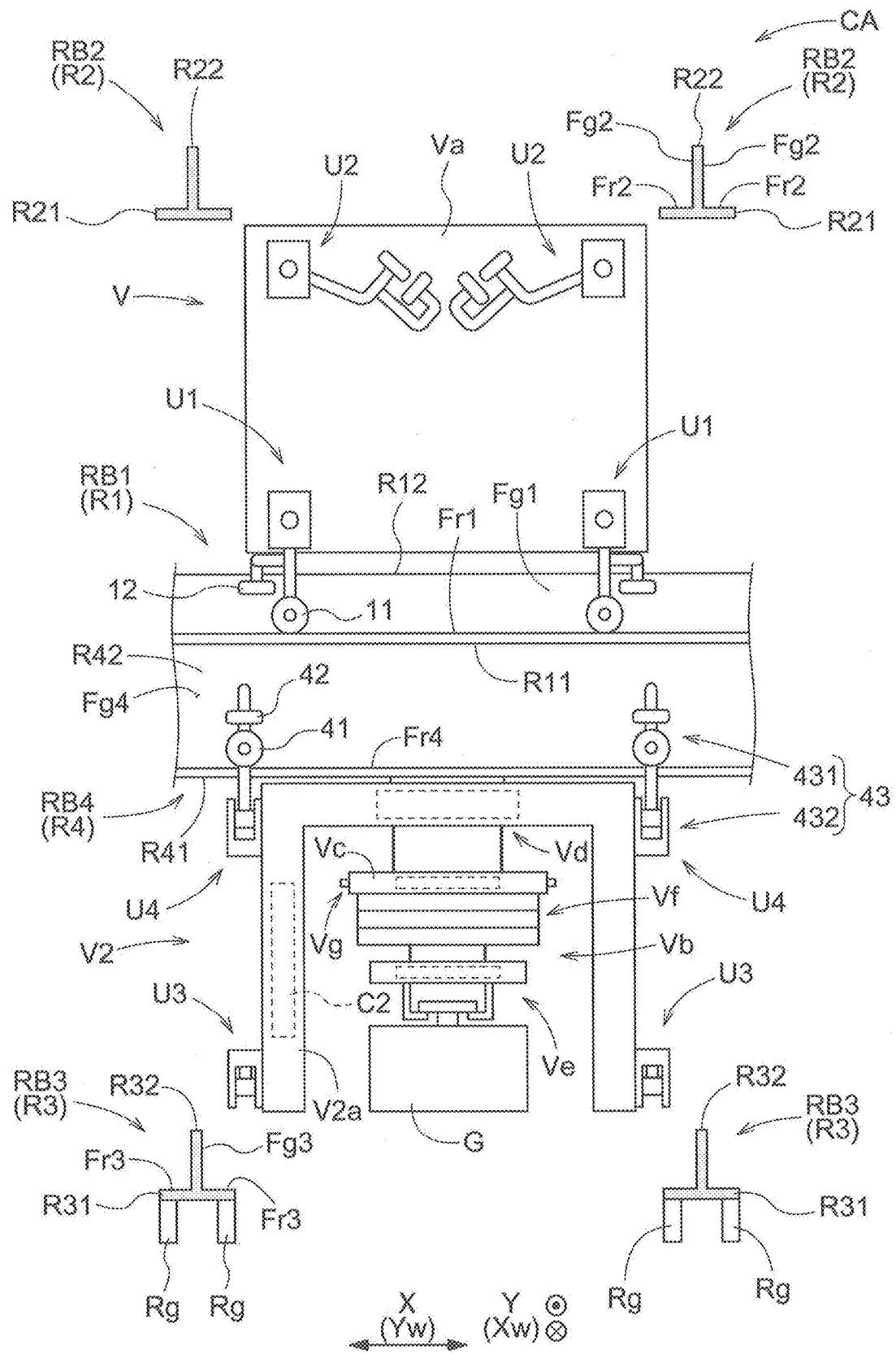
FIG. 8 is a view in a second direction showing a state in which the transport vehicle is executing the first mode and the second transport vehicle is executing the fourth mode in the second embodiment.

As shown in FIGS. 7 and 8, the article transport facility 100 according to this embodiment includes a second transport vehicle V2, a third rail R3 including third travel surfaces Fr3, and a fourth rail R4 including fourth travel surfaces Fr4.

The second transport vehicle V2 travels on a different travel route from that of the transport vehicle V. Specifically, the second transport vehicle V2 can travel along the third rail R3 and along the fourth rail R4. That is, the travel route of the second transport vehicle V2 is set along each of the third rail R3 and the fourth rail R4.

The third rail R3 is spaced downward relative to the first rail R1 and intersects the first rail R1 in a view in the up-down direction. In this example, the third rail R3 is arranged parallel to the second rail R2. That is, in this example, the third rail R3 extends along the second direction Y, and is orthogonal to the first rail R1 in a view in the up-down direction.

The fourth rail R4 is disposed between the first rail R1 and the third rail R3 in the up-down direction, and is parallel to the first rail R1 in a view in the up-down direction. That is, in this example, the fourth rail R4 extends along the first direction X, and intersects both the second rail R2 and the third rail R3 in a view in the up-down direction.

Thus, in this embodiment, the third rail R3 extends along the second direction Y, and the fourth rail R4 extends along the first direction X. For this reason, the third rail R3 and the fourth rail R4 are orthogonal to each other in a view in the up-down direction. A plurality of third rails R3 are disposed side by side in the second width direction Yw (first direction X). Also, a plurality of fourth rails R4 are disposed side by side in the first width direction Xw (second direction Y). As a result, in this example, a travel route in which the plurality of third rails R3 and the plurality of fourth rails R4 form a lattice in a view in the up-down direction is provided in the intersection area CA.

As described above, the fourth rail R4 includes the fourth travel surfaces Fr4 on which the second transport vehicle V2 travels along the first direction X. In the present embodiment, the fourth rail R4 includes fourth guide surfaces Fg4 facing a direction (in this example, the second direction Y) orthogonal to the first direction X in a view from above. In other words, the fourth rail R4 includes the fourth guide surfaces Fg4 facing the first width direction Xw.
The fourth guide surfaces Fg4 are surfaces for guiding the second transport vehicle V2 along the first direction X.

Also, as described above, the third rail R3 includes the third travel surfaces Fr3 on which the second transport vehicle V2 travels along the second direction Y. In this embodiment, the third rail R3 includes third guide surfaces Fg3 facing a direction (in this example, the first direction X) orthogonal to the second direction Y in a view from above. In other words, the third rail R3 includes the third guide surfaces Fg3 facing the second width direction Yw. The third guide surfaces Fg3 are surfaces for guiding the second transport vehicle V2 along the second Y direction.

As shown in FIG. 7, in this embodiment, the fourth rail R4 includes a pair of fourth rail bodies RB4 spaced apart in the first width direction Xw. In this example, each of the plurality of fourth rails R4 disposed side by side in the first width direction Xw includes a pair of fourth rail bodies RB4 spaced apart in the first width direction Xw. That is, one fourth rail R4 is constituted by a pair of fourth rail bodies RB4 spaced apart in the first width direction Xw, and a plurality of the fourth rails R4 are disposed side by side in the first width direction Xw.

In this embodiment, two fourth rails R4 that are adjacent to each other in the first width direction Xw share one fourth rail body RB4, and a pair of fourth travel surfaces Fr4 belonging to the two fourth rails R4 that are adjacent to each other in the first width direction Xw are formed in the fourth rail body RB4. As a result, the number of fourth rail bodies RB4 to be installed can be reduced in the entire facility. Accordingly, it is easy to reduce the number of man-hours when installing the fourth rails R4.

In this embodiment, the fourth rail body RB4 and the first rail body RB1 adjacent above the fourth rail body RB4 are formed in one piece. As a result, it is possible to reduce the number of first rail bodies RB1 and fourth rail bodies RB4 to be installed in the entire facility while realizing a configuration in which the transport vehicle V and the second transport vehicle V2 travel at different positions in the up-down direction. Accordingly, it is easy to reduce the number of man-hours when installing the first rails R1 and the fourth rails R4.

In the present embodiment, the fourth rail body RB4 includes a fourth main body portion R41 extending along the first direction X, and a fourth wall portion R42 that protrudes upward from the fourth main body portion R41 and extends along the first direction X. The fourth travel surfaces Fr4 are formed by the upward-facing surface of the fourth main body portion R41. In this example, the fourth travel surfaces Fr4 are disposed on both sides of the fourth wall portion R42 in the first width direction Xw. The fourth guide surfaces Fg4 are formed by the surfaces of the fourth wall portion R42 facing both sides in the first width direction Xw.
With the above configuration, it is possible to cause both the second transport vehicle V2 that travels on one side of the fourth wall R42 in the first width direction Xw and the second transport vehicle V2 (not shown) that travels on the other side of the fourth wall R42 in the first width direction Xw to appropriately travel with the pair of fourth travel surfaces Fr4 provided on one fourth rail body RB4, and it is possible to appropriately guide the second transport vehicles V2 with the pair of fourth guide surfaces Fg4 provided on one fourth rail body RB4.

As described above, in the present embodiment, the fourth rail body RB4 and the first rail body RB1 adjacent above the fourth rail body RB4 are formed in one piece. In this example, the fourth wall portion R42 of the fourth rail body RB4 is coupled to the first main body portion R11 of the first rail body RB1 from below. As a result, the fourth rail body RB4 and the first rail body RB1 are formed in one piece. For example, the fourth rail body RB4 and the first rail body RB1 may be formed in one piece by coupling a member forming the fourth rail body RB4 and another member forming the first rail body RB1 to each other. Alternatively, the fourth rail body RB4 and the first rail body RB1 may be composed of one identical member. In other words, part of the identical member may constitute the fourth rail body RB4 and another part may constitute the first rail body RB1.

As shown in FIG. 8, in the present embodiment, the third rail R3 includes a pair of third rail bodies RB3 spaced apart in the second width direction Yw. In this example, each of the plurality of third rails R3 disposed side by side in the second width direction Yw includes a pair of third rail bodies RB3 spaced apart in the second width direction Yw. That is, one third rail R3 is constituted by a pair of third rail bodies RB3 spaced apart in the second width direction Yw, and the plurality of third rails R3 are disposed side by side in the second width direction Yw.

In this embodiment, two third rails R3 adjacent to each other in the second width direction Yw share one third rail body RB3, and a pair of third travel surfaces Fr3 belonging to each of the two third rails R3 adjacent to each other in the second with direction Yw are formed in the third rail body RB3. As a result, the number of third rail bodies RB3 to be installed can be reduced in the entire facility. Accordingly, it is easy to reduce the number of man-hours when installing the third rails R3.

In this embodiment, the third rail body RB3 includes a third main body portion R31 extending along the second direction Y, and a third wall portion R32 that protrudes upward from the third main body portion R31 and extends along the second direction Y. The third travel surfaces Fr3 are formed by the upward-facing surface of the third main body portion R31. In this example, the third travel surfaces Fr3 are arranged on both sides of the third wall portion R32 in the second width direction Yw. The third guide surfaces Fg3 are formed by the surfaces of the third wall portion R32 facing both sides in the second width direction Yw.

With the above-described configuration, it is possible to cause both the second transport vehicle V2 traveling on one side of the third wall portion R32 in the second width direction Yw, and the second transport vehicle V2 (not shown) traveling on the other side of the third wall portion R32 in the second width direction Yw to appropriately travel with the pair of third travel surfaces Fr3 provided on one third rail body RB3, and it is possible to appropriately guide the pair of transport vehicles V2 with the pair of third guide surfaces Fg3 provided on one third rail body RB3. In this example, the cross section of the third rail body RB3 orthogonal to the second direction Y is formed in an inverted T shape.

The second transport vehicle V2 includes a second vehicle body V2a, a third traveling unit U3 that causes the second vehicle body V2a to travel along a third rail R3, a fourth traveling unit U4 that causes the second vehicle body V2a to travel along a fourth rail R4, and a second control unit C2 (see FIG. 8) that controls the operations of the third traveling unit U3 and the fourth traveling unit U4. The second vehicle body V2a is disposed between the third rail R3 and the fourth rail R4 in the up-down direction. Specifically, the second vehicle body V2a is disposed between the upper end of the third rail body RB3 (the upper end of the third wall portion R32) and the lower end of the fourth rail body RB4 (the lower end of the fourth main body portion R41) in the up-down direction. The other configurations of the second transport vehicle V2 (e.g., the configuration for transferring the article G) may be the same as or partially different from the configuration of the transport vehicle V described above.

The third traveling unit U3 includes a third wheel 31 and a third orientation changing mechanism 33 that changes the orientation of the third wheel 31 relative to the second vehicle body V2a, and the third traveling unit U3 performs an orientation change between a third wheel placement orientation, in which the third wheel is placed on the third traveling surface Fr3, and a third wheel retraction orientation, in which the third wheel 31 is separated from the third travel surface Fr3. FIGS. 7 and 8 show the third wheel retraction orientation of the third traveling unit U3.

In this embodiment, the third traveling unit U3 includes a third guide wheel 32 guided by the third guide surface Fg3. The third guide wheel 32 is in contact with the third guide surfaces Fg3 while the third traveling unit U3 is in the third wheel placement orientation, and is separated from the third guide surface Fg3 while the third traveling unit U3 is in the third wheel retraction orientation. With such a configuration, when the third traveling unit U3 causes the second vehicle body V2a to travel along the third rail R3 in the third wheel placement orientation, the third guide wheel 32 appropriately guides the second vehicle body V2a along the third rail R3.

Although detailed illustration is omitted, in the present embodiment, while the third traveling unit U3 is in the third wheel placement orientation, the third wheel 31 is placed on the third travel surface Fr3 with the rotation axis of the third wheel 31 directed in the second width direction Yw (first direction X). Also, while the third traveling unit U3 is in the third wheel placement orientation, the third guide wheel 32 is in contact with the third guide surface Fg3 with the rotation axis of the third guide wheel 32 directed in the up-down direction.

In this embodiment, the second transport vehicle V2 includes a plurality of third traveling units U3. The second transport vehicle V2 travels along the third rail R3 using the plurality of third traveling units U3. As described above, the third rail R3 on which the second transport vehicle V2 travels along the second direction Y includes a pair of third rail bodies RB3 spaced apart in the second width direction Yw (see FIG. 8). In this embodiment, the third traveling units U3 are provided corresponding to the pair of third rail bodies RB3 spaced apart in the second width direction Yw. Also, in this example, a pair of third traveling units U3 are separated from each other in the second direction Y on both side portions in the second width direction Yw (first direction X) of the second vehicle body V2a (see FIG. 7). That is, in this example, the second transport vehicle V2 has a total of four third traveling units U3.

The fourth traveling unit U4 includes a fourth wheel 41 and a fourth orientation changing mechanism 43 that changes the orientation of the fourth wheels 41 relative to the second vehicle body V2a, and the fourth traveling unit U4 performs an orientation change between a fourth wheel placement orientation, in which the fourth wheel is placed on the fourth travel surface Fr4, and a fourth wheel retraction orientation, in which the fourth wheel 41 is separated from the fourth travel surface Fr4. FIGS. 7 and 8 show the fourth wheel placement orientation of the fourth traveling unit U4.

In this embodiment, the fourth traveling unit U4 includes a fourth guide wheel 42 guided by the fourth guide surface Fg4. The fourth guide wheel 42 is in contact with the fourth guide surface Fg4 while the fourth traveling unit U4 is in the fourth wheel placement orientation, and is separated from the fourth guide surface Fg4 while the fourth traveling unit U4 is in the fourth wheel retraction orientation. With such a configuration, when the fourth traveling unit U4 causes the second vehicle body V2a to travel along the fourth rail R4 in the fourth wheel placement orientation, the fourth guide wheel 42 can appropriately guide the second vehicle body V2a along the fourth rail R4.

In the present embodiment, while the fourth traveling unit U4 is in the fourth wheel placement orientation, the fourth wheel 41 is placed on the fourth travel surface Fr4 with the rotation axis of the fourth wheel 41 directed in the first width direction Xw (second direction Y). Also, while the fourth traveling unit U4 is in the fourth wheel placement orientation, the fourth guide wheel 42 is in contact with the fourth guide surface Fg4 with the rotation axis of the fourth guide wheel 42 directed in the up-down direction.

In this embodiment, the second transport vehicle V2 includes a plurality of fourth traveling units U4. The second transport vehicle V2 travels along the fourth rail R4 using a plurality of fourth traveling units U4. As described above, the fourth rail R4 on which the second transport vehicle V2 travels along the first direction X includes a pair of fourth rail bodies RB4 spaced apart other in the first width direction Xw (see FIG. 7). In this embodiment, the fourth traveling units U4 are provided corresponding to the pair of fourth rail bodies RB4 spaced apart in the first width direction Xw. Also, in this example, a pair of fourth traveling units U4 are separated from each other in the second direction Y on both side portions in the second width direction Yw (first direction X) of the second vehicle body V2a (see FIG. 7). That is, in this example, the second transport vehicle V2 has a total of four fourth traveling units U4.

The second control unit C2 can change in mode between a third mode of causing the second vehicle V2a to travel along the third rail R3 with the third traveling unit U3 in the third wheel placement orientation and the fourth traveling unit U4 in the fourth wheel retraction orientation, and a fourth mode of causing the second vehicle body V2a to travel along the fourth rail R4 with the fourth traveling unit U4 in the fourth wheel placement orientation and the third traveling unit U3 in the third wheel retraction orientation. FIGS. 7 and 8 show a state in which the second control unit C2 is executing the fourth mode. Note that the mode change between the third mode and the fourth mode is executed while the second vehicle body V2a is arranged at the intersection of the third rail R3 and the fourth rail R4 in a view in the up-down direction.

In this embodiment, the third wheel 31 and the third guide wheel 32 are above the third rail R3 in the third wheel retraction orientation of the third traveling unit U3. As a result, when the second control unit C2 executes the fourth mode and the second transport vehicle V2 travels along the first direction X, the third wheels 31 and the third guide wheels 32 can be prevented from interfering with the third rail R3. Accordingly, it is possible to cause the second transport vehicle V2 to appropriately travel along the first direction X.

Although detailed illustration is omitted, in this embodiment, the fourth wheels 41 and the fourth guide wheels 42 are below the fourth rail R4 when the fourth traveling unit U4 is in the fourth wheel retraction orientation. As a result, when the second control unit C2 executes the third mode and the second transport vehicle V2 travels along the second direction Y, the fourth wheels 41 and the fourth guide wheels 42 can be prevented from interfering with the fourth rail R4. Accordingly, it is possible to cause the second transport vehicle V2 to appropriately travel along the second Y direction.

In this embodiment, the third orientation changing mechanism 33 includes a third support arms 331 that are swingably coupled to the second vehicle body V2a and support the third wheels 31, and third drive units 332 that drive the third support arms 331.

In this embodiment, the third support arm 331 supports the third guide wheel 32 in addition to the third wheel 31. The third support arm 331 rotatably supports both the third wheel 31 and the third guide wheel 32 such that the rotation axis of the third wheel 31 and the rotation axis of the third guide wheel 32 extend in different directions. More specifically, the third support arm 331 supports the third wheel 31 and the third guide wheel 32 such that the direction along the rotation axis of the third wheel 31 and the direction along the rotation axis of the third guide wheel 32 are orthogonal to each other.

In the present embodiment, the third drive unit 332 swings the third support arm 331 about a third swing axis Ax3 extending in the first direction X to change the orientation of the third wheel 31 relative to the second vehicle body V2a. In this example, the third drive unit 332 also changes the orientation of the third guide wheel 32 relative to the second vehicle body V2a by swinging the third support arm 331 about the third swing axis Ax3. The third drive unit 332 includes, for example, a motor.

In this embodiment, the fourth orientation changing mechanism 43 drives a fourth support arm 431 that is swingably coupled to the second vehicle body V2a and supports the fourth wheel 41, and a fourth drive unit 432 that drives the fourth support arm 431.

In this embodiment, the fourth support arm 431 supports the fourth guide wheel 42 in addition to the fourth wheel 41. The fourth support arm 431 rotatably supports both the fourth wheel 41 and the fourth guide wheel 42 such that the rotation axis of the fourth wheel 41 and the rotation axis of the fourth guide wheel 42 extend in different directions. More specifically, the fourth support arm 431 supports the fourth wheel 41 and the fourth guide wheel 42 such that the direction along the rotation axis of the fourth wheel 41 and the direction along the rotation axis of the fourth guide wheel 42 are orthogonal to each other.

In the present embodiment, the fourth drive unit 432 swings the fourth support arm 431 about the fourth swing axis Ax4 along the first direction X to change the orientation of the fourth wheel 41 relative to the second vehicle body V2a. In this example, the fourth drive unit 432 also changes the orientation of the fourth guide wheel 42 relative to the second vehicle body V2a by swinging the fourth support arm 431 about the fourth swing axis Ax4. The fourth drive unit 432 includes, for example, a motor.

Other Embodiments

Next, another embodiment of the article transport facility will be described.

Figure 9:
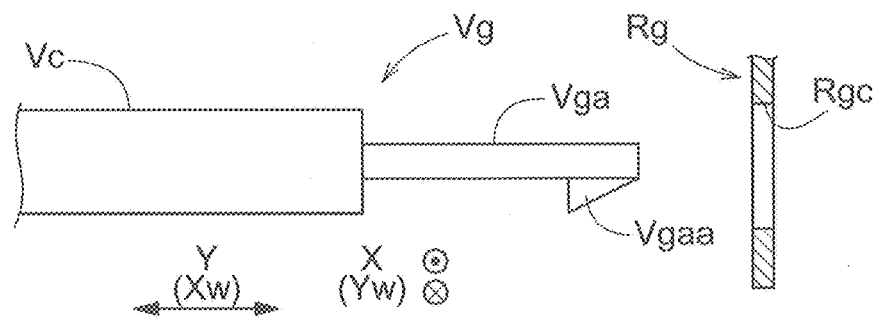
FIG. 9 is a diagram showing another example of the engaging portion and the engaged portion.

(1) In the above embodiment, an example was described in which the engaged portion Rg includes the block portion Rga and the engaged hole Rgb formed in the block portion Rga, and the engaged hole Rgb is formed in a conical shape. However, there is no limitation to such an example, and for example, as shown in FIG. 9, the engaged portion Rg may include a through hole Rgc passing through the plate-shaped member. In this case, it is preferable that the engaging portion Vga of the engagement apparatus Vg has, for example, a hook Vgaa that is engaged with the engaged portion Rg. In this case, the engaging portion Vga enters the engaged orientation when the hook Vgaa is engaged with the engaged portion Rg.

Figure 10:
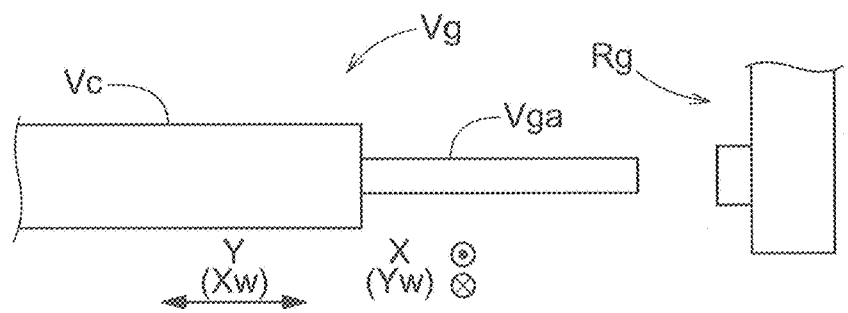
FIG. 10 is a diagram showing another example of the engaging portion and the engaged portion.

As another example of the engaging portion Vga and the engaged portion Rg, as shown in FIG. 10, one of the engaged portion Rg and the engaging portion Vga may be constituted by a magnetic member, and the other may be constituted by a magnet (a permanent magnet or an electromagnet). In this case, the engaging portion Vga enters the engagement orientation by being attracted to the engaged portion Rg by magnetic force.

Figure 11:
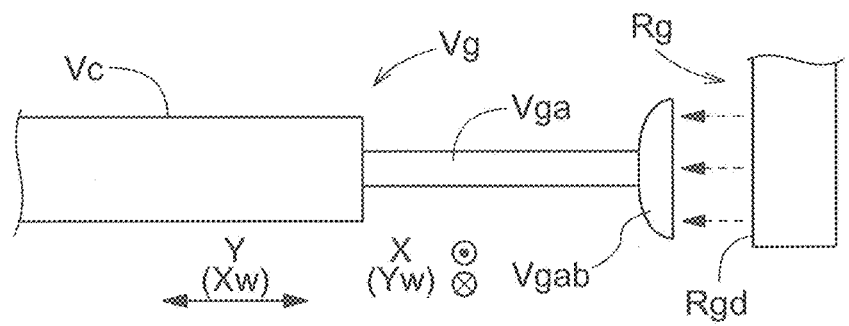
FIG. 11 is a diagram showing another example of the engaging portion and the engaged portion.

Also, as another example of the engaging portion Vga and the engaged portion Rg, the engaged portion Rg may include an attraction surface Rgd that attracts the engaging portion Vga, as shown in FIG. 11. In this case, the engaging portion Vga preferably has a suction portion Vgab that generates a suction force. In this case, the engaging portion Vga enters the engagement orientation by being attracted to the attraction surface Rgd of the engaged portion Rg by the suction force of the suction portion Vgab. As the suction portion Vgab, for example, a pump or the like that generates negative pressure can be used.

Figure 12:
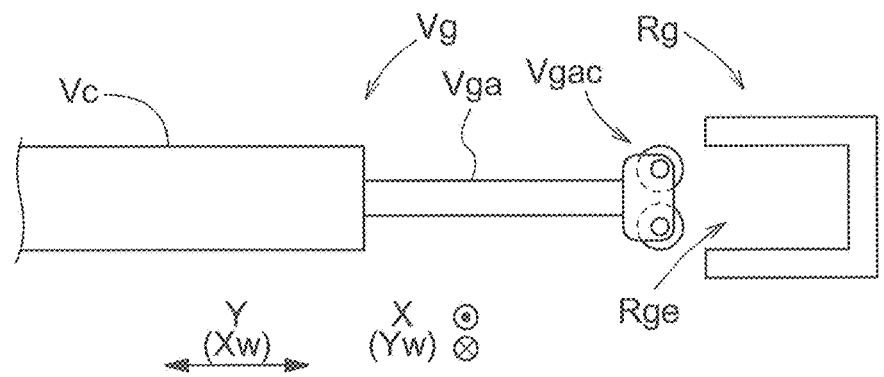
FIG. 12 is a diagram showing another example of the engaging portion and the engaged portion.

Also, as another example of the engaging portion Vga and the engaged portion Rg, as shown in FIG. 12, the engaging portion Vga may include a roller Vgac and the engaged portion Rg may include an opening Rge that guides the roller Vgac. In this case, the engagement portion Vga enters the engagement orientation due to the roller Vgac being inserted into the opening Rge.

Figure 13:
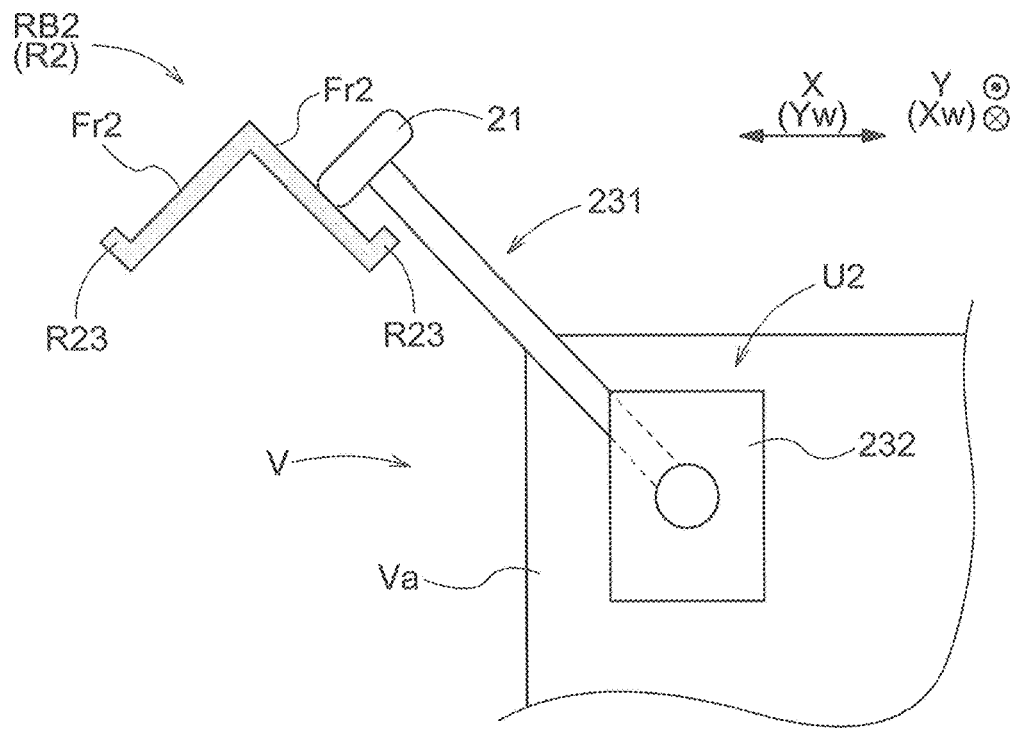
FIG. 13 is a view in a second direction showing another example of a second rail.

(2) In the above embodiment, an example was described in which the second rail R2 includes the second travel surfaces Fr2 and the second guide surfaces Fg2. However, there is no limitation to such an example, and the second rail R2 need not include the second guide surfaces Fg2. In this case, for example, as shown in FIG. 13, the second travel surfaces Fr2 may incline downward toward the inner side in the second width direction Yw. It is preferable that the second rail R2 includes a fall prevention portion R23 that prevents the second wheel 21 from falling off the second travel surface Fr2. In the example shown in FIG. 13, the fall prevention portion R23 is formed to rise upward from the inner end of the second travel surface Fr2 in the second width direction Yw. Note that the second traveling units U2 need not include the second guide wheels 22 in the configuration described above. The above also applies to the first rail R1 and the first traveling units U1. That is, the first rail R1 need not include the first guide surfaces Fg1, and the first traveling units U1 need not include the first guide wheels 12. In this case, it is preferable that the first travel surface Fr1 is formed so as to be inclined with respect to the first width direction Xw, and the first rail R1 includes a fall prevention portion that prevents the first wheel 11 from falling off.

Figure 14:
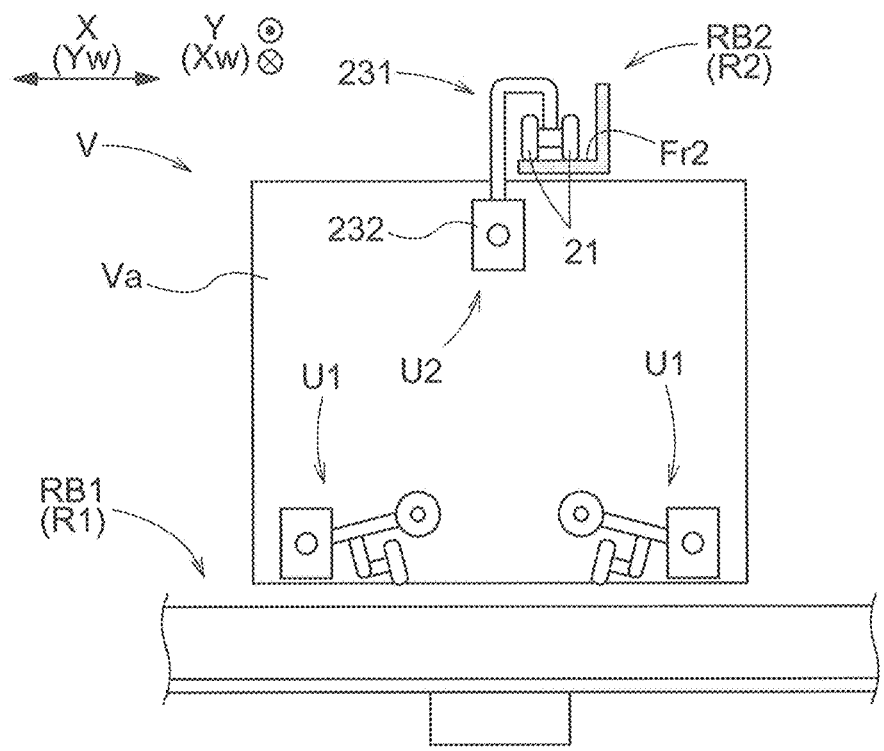
FIG. 14 is a view in a second direction showing another example of the second rail.

(3) In the above-described embodiment, an example was described in which one second rail R2 is constituted by a pair of second rail bodies RB2 spaced apart in the second width direction Yw. However, there is no limitation to such an example, and one second rail R2 may be constituted by one second rail body RB2. In this case, for example, as shown in FIG. 14, the cross section of the second rail body RB2 orthogonal to the second direction Y may be formed in an inverted L shape. Also, it is preferable that the second traveling unit U2 includes a plurality of second wheels 21 (two second wheels 21 in the illustrated example) arranged side by side in the second width direction Yw (the first direction X) in the second wheel placement orientation, and the plurality of second wheels 21 are placed on the second travel surface Fr2. According to this configuration, while the second traveling unit U2 is in the second wheel placement orientation, the orientation of the transport vehicle V is easy to stabilize even though the transport vehicle V is suspended and supported by a single second rail body RB2.

Figure 15:
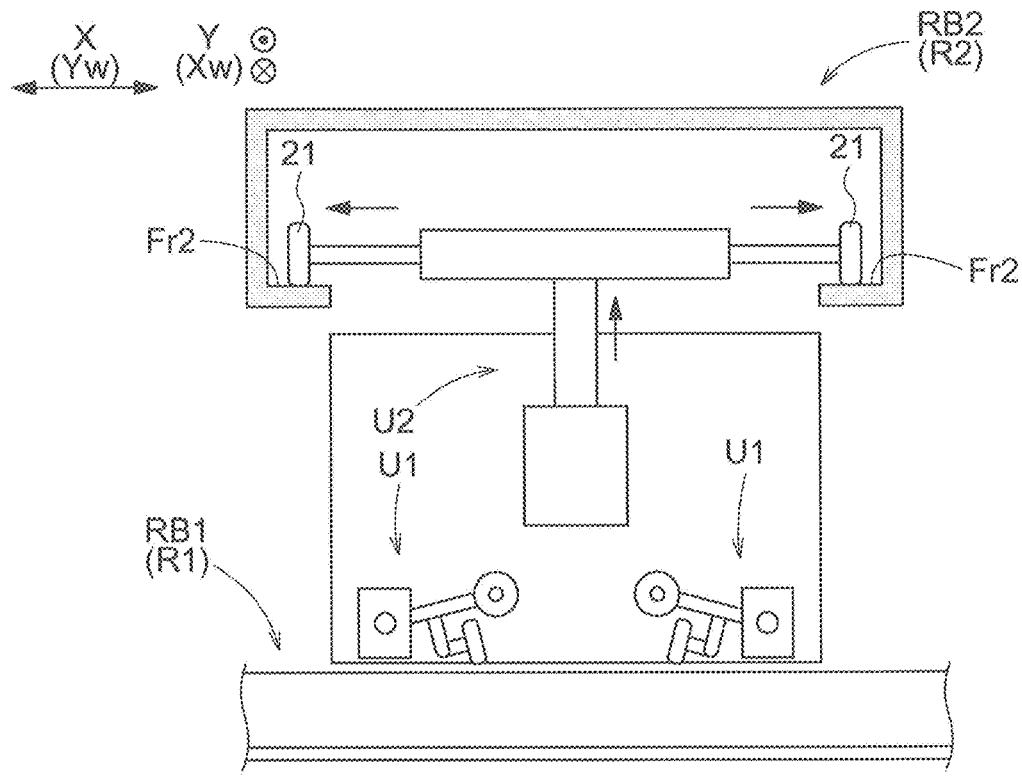
FIG. 15 is a view in a second direction showing another example of the second rail.
Figure 15:
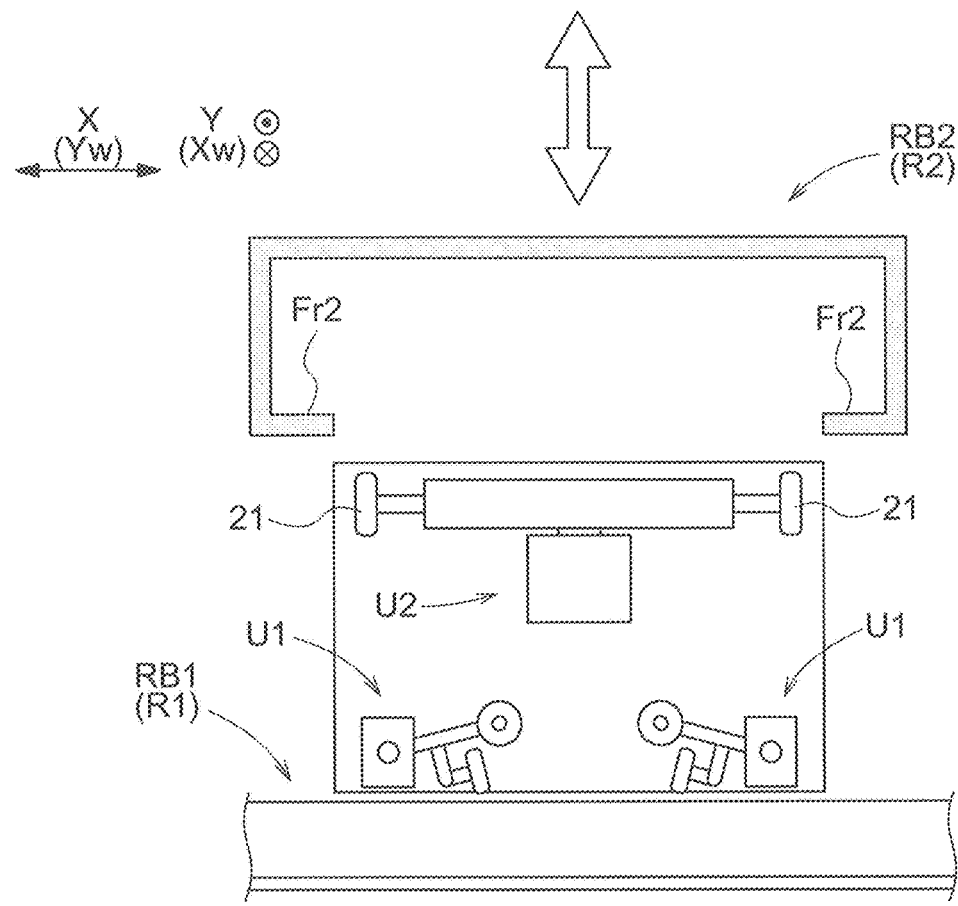

As another example of the second rail R2 constituted by one second rail body RB2, as shown in FIG. 15, the second rail body RB2 may be formed in a tubular shape that is open downward, and may include a pair of second travel surfaces Fr2 spaced apart in the second width direction Yw. In this case, it is preferable that the second traveling unit U2 includes a pair of second wheels 21 spaced apart in the second width direction Yw, raises and lowers the pair of second wheels 21, and moves the pair of second wheels 21 toward or away from each other along the second width direction Yw. By raising the pair of second wheels 21, the second traveling unit U2 aligns the pair of second wheels 21 and the pair of second traveling surfaces Fr2 in the up-down direction. Then, the second traveling unit U2 aligns the pair of second wheels 21 and the pair of second traveling surfaces Fr2 in the second width direction Yw by moving the pair of second wheels 21 away from each other. As a result, the second traveling unit U2 enters the second wheel placement orientation. Note that although detailed illustration is omitted, the first rail R1 may also similarly be constituted by one first rail body RB1 instead of two first rail bodies RB1.

Figure 16:
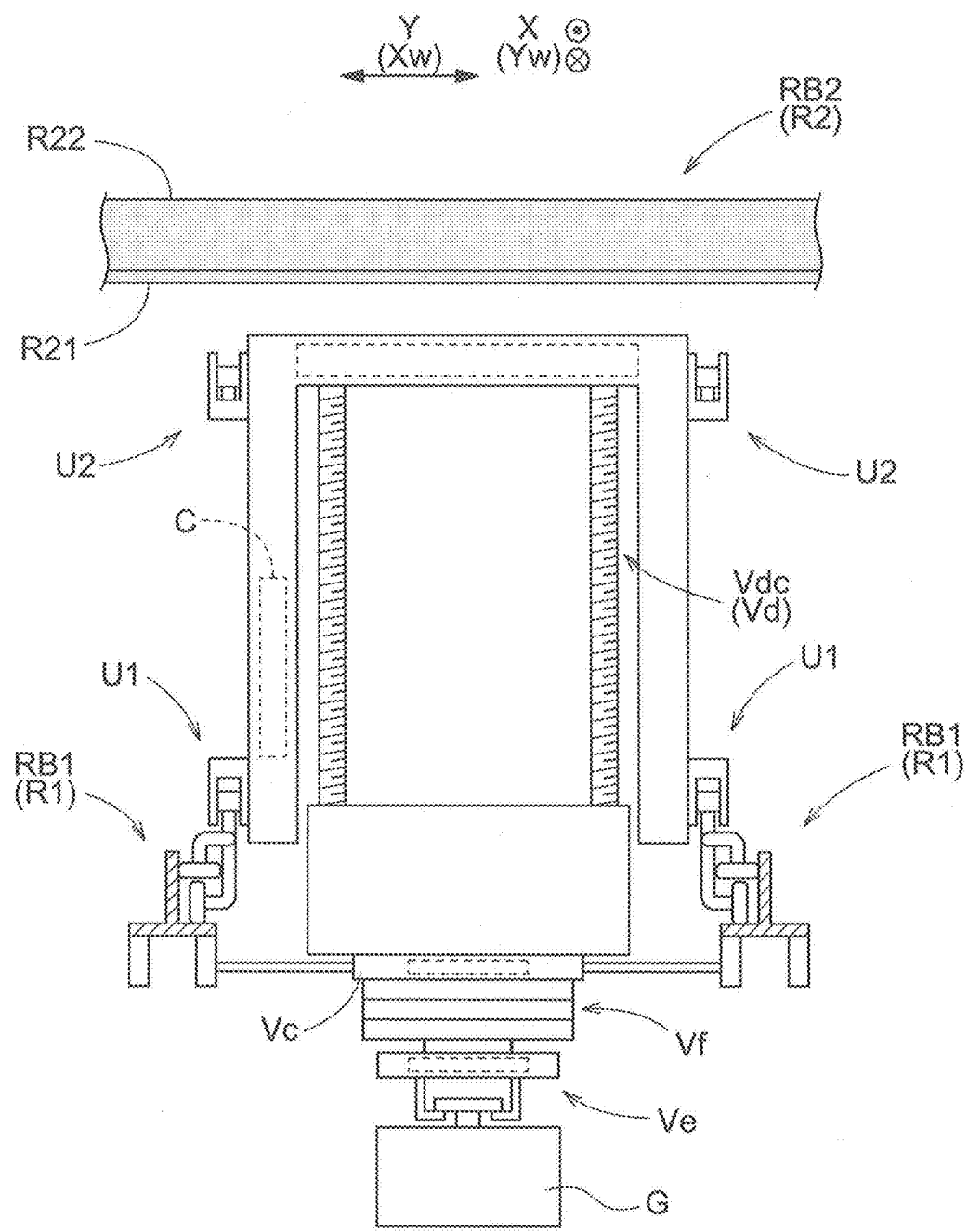
FIG. 16 is a diagram showing another example of an elevating apparatus.

(4) In the above-described embodiment, an example was described in which the elevating apparatus Vd raises and lowers the elevating body Vc by means of the belt Vda coupled to the elevating body Vc and the elevation drive unit Vdb that drives the belt Vda. However, there is no limitation to such an example, and for example, as shown in FIG. 16, the elevating apparatus Vd may raise and lower the elevating body Vc by means of a ball screw mechanism Vdc. In this case, the elevating apparatus Vd preferably includes a driving source such as a motor for rotating the screw portion of the ball screw mechanism Vdc.

Figure 17:
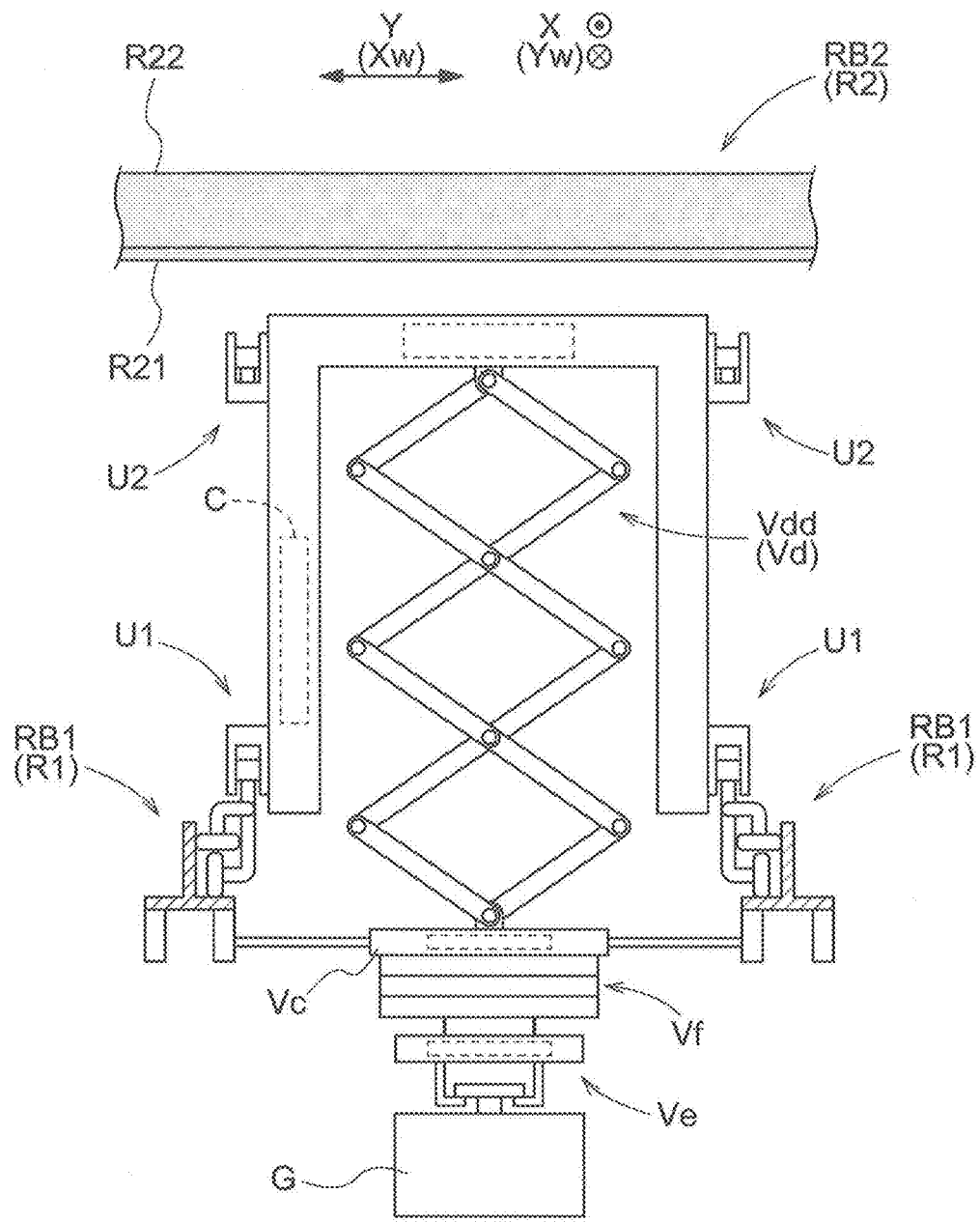
FIG. 17 is a diagram showing another example of the elevating apparatus.

As another example of the elevating apparatus Vd, as shown in FIG. 17, the elevating apparatus Vd may raise and lower the elevating body Vc by means of a pantograph Vdd. Although detailed illustration is omitted, the elevating apparatus Vd may raise and lower the elevating body Vc with use of a cross link or the like.

Figure 18:
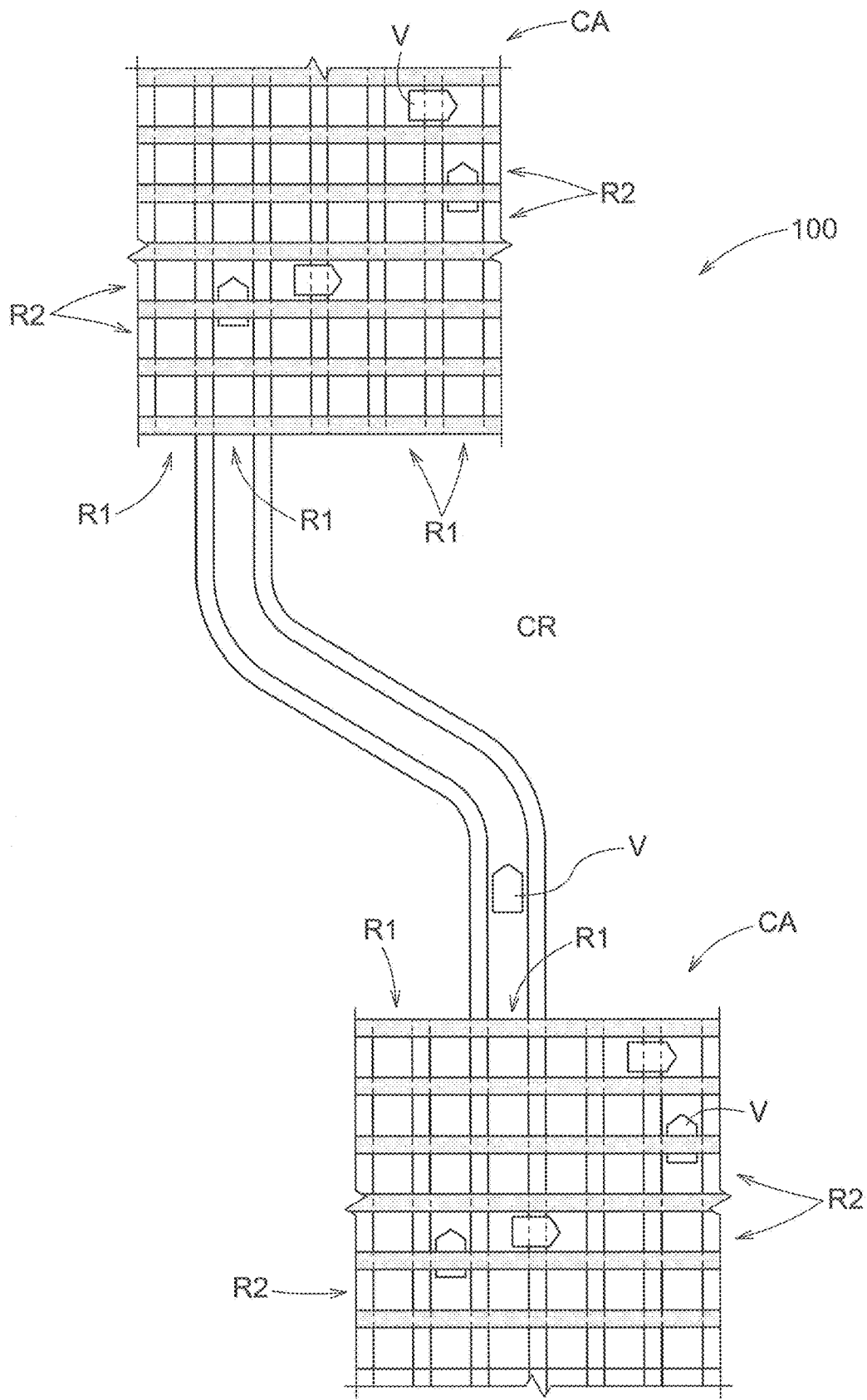
FIG. 18 is a plan view showing a route connecting two intersection areas.

(5) In the above-described embodiment, an example was described in which the article transport facility 100 includes the intersection area CA where the travel route along the first rail R1 and the travel route along the second rail R2 intersect each other. For example, as shown in FIG. 18, the article transport facility 100 may include a plurality of intersection areas CA. In this case, the article transport facility 100 is preferably provided with a connection route CR that connects the plurality of intersection areas CA. The connection route CR may be formed by extending the first rail R1 or the second rail R2 provided in the intersection area CA (in the illustrated example, the first rail R1 is extended). Also, as illustrated, the connection route CR may include a straight section and a curved section.

(6) In the above-described embodiment, an example was described in which the first rail R1 and the second rail R2 are orthogonal to each other in a view in the up-down direction. However, the first rail R1 and the second rail R2 need only intersect in a view in the up-down direction, and need not be orthogonal.

(7) In the above embodiment, an example was described in which the first rail body RB1 includes the first main body portion R11 and the first wall portion R12, and the cross section of the first rail body RB1 orthogonal to the first direction X is in an inverted T-shape. However, there is no limitation to such an example, and the first rail body RB1 need only be provided with a first travel surface Fr1 on which the transport vehicle V travels along the first direction X, and the first rail body RB1 may have any kind of cross-sectional shape.

(8) In the above-described embodiment, an example was described in which the second rail body RB2 includes the second main body portion R21 and the second wall portion R22, and the cross section of the second rail body RB2 orthogonal to the second direction Y is in an inverted T shape. However, there is no limitation to such an example, and the second rail body RB2 need only be provided with a second travel surface Fr2 on which the transport vehicle V travels along the second direction Y, and the second rail body RB2 may have any kind of cross-sectional shape.

(9) In the above-described embodiment, an example was described in which the fourth rail body RB4 and the first rail body RB1 adjacent above the fourth rail body RB4 are formed in one piece. However, there is no limitation to such an example, and the fourth rail body RB4 and the first rail body RB1 adjacent above the fourth rail body RB4 may be separated from each other in the up-down direction.

(10) In the above-described embodiment, an example was described in which the engaged portions Rg are fixed to the first rail R1 below the first travel surfaces Fr1. However, there is no limitation to such an example, and the engaged portions Rg may be disposed above the first travel surfaces Fr1 instead of below the first travel surfaces Fr1. Also, the engaged portions Rg may be fixed to a member other than the first rail R1. The other member may be, for example, a frame or bracket coupled to the first rail R1.

(11) In the above-described embodiment, an example was described in which the first drive unit 132 swings the first support arm 131 about the first swing axis Ax1 extending in the second direction Y, to change the orientation of the first wheel 11 relative to the vehicle body Va. However, there is no limitation to such an example, and the configuration for changing the orientation of the first wheels 11 relative to the vehicle body Va need only realize the first wheel placement orientation and the first wheel retraction orientation of the first traveling unit U1. For example, the first drive unit 132 may change the orientation of the first wheel 11 relative to the vehicle body Va by sliding the first wheel 11 in the up-down direction or swinging the first wheel 11 about an axis different from that in the above embodiment.

(12) In the above-described embodiment, an example was described in which the second drive unit 232 changes the orientation of the second wheel 21 relative to the vehicle body Va by swinging the second support arm 231 about the second swing axis Ax2 extending in the second direction Y. However, there is no limitation to such an example, and the configuration for changing the orientation of the second wheel 21 relative to the vehicle body Va need only realize the second wheel placement orientation and the second wheel retraction orientation of the second traveling unit U2. For example, the second drive unit 232 may change the orientation of the second wheel 21 relative to the vehicle body Va by sliding the second wheel 21 in the up-down direction and the horizontal direction, or swinging the second wheel 21 about an axis different from that in the above embodiment.

(13) In the above-described embodiment, an example was described in which the first drive unit 132 changes the orientation of the first wheel 11 and the orientation of the first guide wheel 12 relative to the vehicle body Va by swinging the first support arm 131. However, there is no limitation to such an example, and the orientation of the first guide wheel 12 may also be changed using a drive source other than the first drive unit 132 or a member other than the first support arm 131.

(14) In the above-described embodiment, an example was described in which the second drive unit 232 changes the orientation of the second wheel 21 and the orientation of the second guide wheel 22 relative to the vehicle body Va by swinging the second support arm 231. However, there is no limitation to such an example, and the orientation of the second guide wheel 22 may be changed using a drive source other than the second drive unit 232 or a member other than the second support arm 231.

(15) In the above-described embodiment, an example was described in which the first wheel 11 is rotationally driven, thereby generating a propulsion force by which the vehicle body Va travels along the first direction X. However, there is no limitation to such an example, and the propulsive force by which the vehicle body Va travels along the first direction X may be generated by another configuration. For example, the engagement between a rack provided along the first rail R1 and a gear provided on the vehicle body Va may be utilized, and the propulsive force may be generated by driving the gear. Alternatively, a linear motor may be used to generate the driving force. A similar configuration can also be used when generating a propulsive force by which the vehicle body Va travels along the second direction Y.

(16) Note that the configurations disclosed in the above-described embodiments can also be applied in combination with configurations disclosed in other embodiments as long as there is no contradiction. Regarding other configurations as well, the embodiments disclosed in this specification are merely examples in all respects. Accordingly, various modifications can be made as appropriate without departing from the spirit of the present disclosure.

Overview of the Embodiments

The article transport facility described above will be described hereinafter.

An article transport facility including a transport vehicle configured to transport an article, the article transport facility including:

at least one first rail including a first travel surface; and
at least one second rail including a second travel surface, in which the at least one second rail is spaced upward relative to the at least one first rail and intersects the at least one first rail in a view in an up-down direction,
the transport vehicle includes a vehicle body disposed between the at least one first rail and the at least one second rail in the up-down direction, a first traveling unit configured to cause the vehicle body to travel along a first direction corresponding to a direction in which the at least one first rail extends, a second traveling unit configured to cause the vehicle body to travel along a second direction corresponding to a direction in the at least one second rail extends, and a control unit configured to control operations of the first traveling unit and the second traveling unit, the first traveling unit includes a first wheel and a first orientation changing mechanism configured to change an orientation of the first wheel relative to the vehicle body, and the first traveling unit is configured to perform an orientation change between a first wheel placement orientation, in which the first wheel is placed on the first travel surface, and a first wheel retraction orientation, in which the first wheel is separated from the first travel surface, the second traveling unit includes a second wheel and a second orientation changing mechanism configured to change an orientation of the second wheel relative to the vehicle body, and the second traveling unit is configured to perform an orientation change between a second wheel placement orientation, in which the second wheel is placed on the second travel surface, and a second wheel retraction orientation, in which the second wheel is separated from the second travel surface, and the control unit is configured to change in mode between (i) a first mode of causing the vehicle body to travel along the at least one first rail with the first traveling unit in the first wheel placement orientation and the second traveling unit in the second wheel retraction orientation, and (ii) a second mode of causing the vehicle body to travel along the at least one second rail with the second traveling unit in the second wheel placement orientation and the first traveling unit in the first wheel retraction orientation.

According to this configuration, it is possible to cause the transport vehicle to travel in the first direction along the first rail and to cause the transport vehicle to travel in the second direction along the second rail. The second rail is spaced upward from the first rail. That is, the first rail and the second rail are disposed at different positions in the up-down direction. As a result, the travel route along the first rail and the travel route along the second rail can be disposed in different horizontal planes while intersecting each other in a view in the up-down direction. Accordingly, with this configuration, there is no seam between the first rail and the second rail, and no level difference occurs due to the existence of the seam, and therefore it is possible to prevent the occurrence of vibration when the transport vehicle travels in the portion where both rails intersect. Also, since the first rail and the second rail are physically separated, the first rail and the second rail can be installed at different times. Accordingly, it is possible to ensure a degree of freedom when installing the travel route constituted by the first rail and the second rail in the article transport facility. As described above, with this configuration, it is possible to suppress the vibration of the transport vehicle and to ensure a degree of freedom in the installation of the travel route in the article transport facility having the travel route where a plurality of routes with different extension directions intersect.

It is preferable that the transport vehicle includes an accommodation portion configured to accommodate the article during travel, and the accommodation portion is provided in the vehicle body.

According to this configuration, the vehicle body disposed between the first rail and the second rail in the up-down direction is provided with the accommodation portion for accommodating the article. As a result, the control unit can make the distance from the wheel supporting the vehicle body to the article approximately the same even when executing the first mode of causing the vehicle body to travel along the first rail or the second mode of causing the vehicle body to travel along the second rail. Accordingly, with this configuration, the article can be conveyed while being stably held.

It is preferable that the second orientation changing mechanism includes a second support arm that is swingably coupled to the vehicle body and supports the second wheel, and a second drive unit configured to drive the second support arm, and the second drive unit changes the orientation of the second wheel relative to the vehicle body by swinging the second support arm about a second swing axis extending in the second direction.

According to this configuration, the second wheel can be appropriately placed on the second travel surface of the second rail disposed above the vehicle body, and the second wheel can be appropriately separated from the second travel surface.

It is preferable that in response to the second orientation changing mechanism changing the orientation of the second traveling unit from the second wheel retraction orientation to the second wheel placement orientation, the second wheel is placed on the second travel surface at a position past an uppermost position of a movement path along which the second wheel moves due to swinging of the second support arm.

According to this configuration, the second wheel can be placed on the second travel surface by approaching the second travel surface from above. Accordingly, with this configuration, when the orientation is changed from the second wheel retraction orientation to the second wheel placement orientation, the orientation can be appropriately changed while reducing the friction between the second wheel and the second travel surface.

It is preferable that the first orientation changing mechanism includes a first support arm that is swingably coupled to the vehicle body and supports the first wheel, and a first drive unit configured to drive the first support arm, and the first drive unit changes the orientation of the first wheel relative to the vehicle body by swinging the first support arm about a first swing axis extending in the second direction.

According to this configuration, the first swing axis, which is the swing center of the first support arm, and the second swing axis, which is the swing center of the second support arm, can be disposed in parallel along the second direction. For this reason, it is possible to make it difficult for the movement ranges of both the first support arm and the second support arm to expand in the second direction. There is also an advantage in that, for example, the first drive unit and the second drive unit can be easily used in common due to the first swing axis and the second swing axis being disposed parallel to each other.

It is preferable that the at least one first rail includes a first guide surface facing a direction intersecting the first direction in a view in the up-down direction, the at least one second rail includes a second guide surface facing a direction intersecting the second direction in a view in the up-down direction, the first traveling unit includes a first guide wheel configured to be guided on the first guide surface, the first guide wheel is configured to be in contact with the first guide surface while the first traveling unit is in the first wheel placement orientation, and to be separated from the first guide surface while the first traveling unit is in the first wheel retraction orientation, the second traveling unit includes a second guide wheel configured to be guided on the second guide surface, and the second guide wheel is configured to be in contact with the second guide surface while the second traveling unit is in the second wheel placement orientation, and to be separated from the second guide surface while the second traveling unit is in the second wheel retraction orientation.

According to this configuration, when the first traveling unit causes the vehicle body to travel along the first rail in the first wheel placement orientation, the first guide wheels can appropriately guide the vehicle body along the first rail. Also, when the second traveling unit causes the vehicle body to travel along the second rail in the second wheel placement orientation, the second guide wheels can appropriately guide the vehicle body along the second rail.

It is preferable that the at least one first rail includes a plurality of first rails disposed side by side in a direction intersecting the first direction in a view in the up-down direction, and the at least one second rail includes a plurality of second rails disposed side by side in a direction intersecting the second direction in a view in the up-down direction.

According to this configuration, it is possible to ensure a wide traveling range of the transport vehicle over the range extending in the first direction and the second direction.

It is preferable that the transport vehicle includes an elevating body coupled to the vehicle body, an elevating apparatus configured to raise and lower the elevating body relative to the vehicle body, and a holding section supported by the elevating body and configured to hold the article.

According to this configuration, the article can be transferred to a position spaced apart in the up-down direction relative to the transport vehicle.

It is preferable that the transport vehicle includes an elevating body coupled to the vehicle body, an elevating apparatus configured to raise and lower the elevating body relative to the vehicle body, a holding section supported by the elevating body and configured to hold the article, a slide apparatus configured to slide the holding section in a horizontal direction relative to the elevating body, and an engagement apparatus supported by the elevating body, the at least one first rail includes an engaged portion, the engagement apparatus includes an engaging portion configured to engage with the engaged portion, and an engagement drive unit configured to change an orientation of the engaging portion between an engagement orientation and a release orientation, while the engaging portion is in the engagement orientation, the engaging portion is engaged with the engaged portion to restrict raising, lowering, and tilting of the elevating body, and while the engaging portion is in the release orientation, the engaging portion is separated from the engaged portion to allow raising and lowering of the elevating body, and the control unit causes the engaging portion to have the release orientation in response to the elevating apparatus raising or lowering the elevating body, and causes the engaging portion to have the engagement orientation in response to the slide apparatus causing the holding section to protrude in the horizontal direction relative to the elevating body.

According to this configuration, it is possible to cause the transport vehicle to travel in the first direction along the first rail and to cause the transport vehicle to travel in the second direction along the second rail. The second rail is spaced upward from the first rail. That is, the first rail and the second rail are disposed at different positions in the up-down direction. As a result, the travel route along the first rail and the travel route along the second rail can be disposed in different horizontal planes while intersecting each other in a view in the up-down direction. Accordingly, with this configuration, there is no seam between the first rail and the second rail, and no level difference occurs due to the existence of the seam, and therefore it is possible to prevent the occurrence of vibration when the transport vehicle travels in the portion where both rails intersect. Also, according to this configuration, the article held by the holding section can be disposed at a position shifted in the horizontal direction relative to the elevating body due to the operation of the slide apparatus. For this reason, it is possible to transfer the article to a position shifted in the horizontal direction from directly below the transport vehicle. Also, when such transfer is performed, tilting of the elevating body can be restricted by causing the engaging portion to have the engagement orientation. As a result, it is possible to appropriately transfer the article to a position shifted in the horizontal direction from directly below the transport vehicle. As described above, according to this configuration, in an article transport facility having a travel route where a plurality of routes with different extension directions intersect each other, vibration of the transport vehicle can be suppressed, and the article can be transferred to a position shifted in the horizontal direction from directly below the transfer vehicle.

It is preferable that a storage shelf configured to hold the article is further included, in which the storage shelf is supported by the at least one first rail, below the at least one first rail, the transport vehicle is configured to be capable of executing a delivery operation of delivering the article to the storage shelf and a reception operation of receiving the article from the storage shelf, by the slide apparatus sliding the holding section, and in response to the control unit causing the transport vehicle to execute the delivery operation or the reception operation, the control unit causes the elevating mechanism to position the elevating body at a height corresponding to the storage shelf and causes the engaging portion to have the engagement orientation.

According to this configuration, the storage shelf for temporary or long-term storage of an article can be disposed using the space below the first rail. When an article is transferred to and from the storage shelf, it is possible to use an elevating operation of the elevating body by the elevating device and a sliding operation of the holding section by the sliding device. Also, when the holding section is slid, it is possible to suppress tilting of the elevating body since the engaging portion is in the engagement orientation. Accordingly, it is possible to appropriately transfer the article to the storage shelf.

It is preferable that the engaged portion is at a position corresponding to a transfer target location where the article is transferred to or from the vehicle, in the first direction, and the engaging portion also performs positioning of the elevating body in the first direction while in the engagement orientation.

According to this configuration, by causing the engaging portion to have the engagement orientation, the elevating body can be positioned in the first direction at the position corresponding to the transfer target location in the first direction. This makes it easier to accurately transfer the article to the transfer target location.

It is preferable that the transport vehicle further includes a second elevation apparatus configured to raise and lower the holding section relative to the slide apparatus, below the slide apparatus.

According to this configuration, the second elevating apparatus can raise and lower the holding section from a position where the slide apparatus causes the holding section to protrude in the horizontal direction relative to the elevating body. Accordingly, with this configuration, it is possible to increase the number of locations where the articles can be transferred by the transport vehicle, and it is possible to improve the versatility of the transfer target locations of the article.

It is preferable that the at least one first rail includes a pair of first rail bodies spaced apart in a first width direction intersecting the first direction in a view in the up-down direction,
 the elevating apparatus raises and lowers the elevating body between the pair of first rail bodies in the first width direction in a view in the up-down direction,
 the engaged portion is provided on at least one of the pair of first rail bodies, and
 the engagement drive unit changes the orientation of the engaging portion between the engagement orientation and the release orientation by extending and retracting the engaging portion in the first width direction.

According to this configuration, in the configuration in which the elevating body is disposed between the pair of first rail bodies in the first width direction, the engaging device supported by the elevating body can appropriately cause the engaging portion to engage with and separate from the engaged portion provided on at least one of the pair of first rail bodies by causing the engaging portion to extend and retract along the first width direction.

It is preferable that the engaged portion is fixed to the at least one first rail below the first travel surface.

According to this configuration, the engaged portion can be disposed at a position that does not interfere with the first travel wheel placed on the first travel surface. Also, since the engaged portion is fixed to the first rail, the structure for supporting the engaged portion can be simplified.

It is preferable that the at least one first rail includes a plurality of first rails disposed side by side in a first width direction intersecting the first direction in a view in the up-down direction,
 each of the plurality of first rails includes a pair of first rail bodies spaced apart in the first width direction, and
 two of the first rails adjacent to each other in the first width direction share one of the first rail bodies, and a pair of the first travel surfaces belonging to each of the two first rails adjacent to each other in the first width direction are formed in the first rail body.

According to this configuration, it is possible to cause the transport vehicle to travel in the first direction along the first rail and to cause the transport vehicle to travel in the second direction along the second rail. The second rail is spaced upward from the first rail. That is, the first rail and the second rail are disposed at different positions in the up-down direction. As a result, the travel route along the first rail and the travel route along the second rail can be disposed in different horizontal planes while intersecting each other in a view in the up-down direction. Accordingly, with this configuration, there is no seam between the first rail and the second rail, and no level difference occurs due to the existence of the seam, and therefore it is possible to prevent the occurrence of vibration when the transport vehicle travels in the portion where both rails intersect. Also, according to this configuration, since two first rails adjacent to each other in the first width direction share one first rail body, it is possible to reduce the number of first rail bodies to be installed in the entire facility. Thus, it is easy to reduce the number of man-hours when installing the first rail. As described above, according to the present configuration, in an article transport facility including a travel route on which a plurality of routes extending in different directions intersect each other, it is possible to suppress vibration of the transport vehicle and to reduce man-hours for installing the travel route.

It is preferable that each of the first rails includes a first guide surface facing the first width direction,
 the first traveling unit includes a first guide wheel configured to be guided on the first guide surface,
 the first guide wheel is configured to be in contact with the first guide surface while the first traveling unit is in the first wheel placement orientation, and to be separated from the first guide surface while the first traveling unit is in the first wheel retraction orientation,
 each of the first rail bodies includes a first main body portion extending in the first direction, and a first wall portion protruding upward from the first main body portion and extending in the first direction,
 the first travel surfaces are formed by an upward-facing surface of the first main body portion,
 the first travel surfaces are disposed on opposite sides of the first wall portion in the first width direction, and
 the first guide surfaces are formed by surfaces of the first wall portion that face opposite sides in the first width direction.

According to this configuration, when the first traveling unit causes the vehicle body to travel along the first rail in the first wheel placement orientation, the first guide wheels can appropriately guide the vehicle body along the first rail. The first guide surface for guiding the first guide wheel is formed on each of the surfaces of the first wall portion of the first rail body facing both sides in the first width direction. As a result, both the first guide wheel used for the transport vehicle traveling on one side of the first wall portion in the first width direction and the first guide wheel provided on the other transport vehicle traveling on the other side of the first wall portion in the first width direction can be appropriately guided by the pair of first guide surfaces provided on one first rail body.

It is preferable that the at least one second rail includes a plurality of second rails disposed side by side in a second width direction intersecting the second direction in a view in the up-down direction,
 each of the plurality of second rails includes a pair of second rail bodies spaced apart in the second width direction, and
 two of the second rails adjacent to each other in the second width direction share one of the second rail bodies, and a pair of the second travel surfaces belonging to each of the two second rails adjacent to each other in the second width direction are formed in the second rail body.

According to this configuration, two second rails adjacent to each other in the second width direction share one second rail body, and therefore the number of second rail bodies to be installed can be reduced in the entire facility. Thus, the number of man-hours for installing the second rail can be easily suppressed.

It is preferable that each of the second rails includes a second guide surface facing the second width direction,
   the second traveling unit includes a second guide wheel configured to be guided on the second guide surface,
   the second guide wheel is configured to be in contact with the second guide surface while the second traveling unit is in the second wheel placement orientation, and to be separated from the second guide surface while the second traveling unit is in the second wheel retraction orientation,
   each of the second rail bodies includes a second main body portion extending in the second direction, and a second wall portion protruding upward from the second main body portion and extending in the second direction,
   the second travel surfaces are formed by an upward-facing surface of the second main body portion,
   the second travel surfaces are disposed on opposite sides of the second wall portion in the second width direction, and
   the second guide surfaces are formed by surfaces of the second wall portion that face opposite sides in the second width direction.

According to this configuration, when the second traveling unit causes the vehicle body to travel along the second rail in the second wheel placement orientation, the second guide wheels can appropriately guide the vehicle body along the second rail. Also, second guide surfaces for guiding the second guide wheels are formed on the surfaces facing both sides in the second width direction of the second wall portion of the second rail body. As a result, both the second guide wheel used for the transport vehicle traveling on one side of the second wall in the second width direction and the second guide wheel used for the other transport vehicle traveling on the other side of the second wall in the second width direction can be appropriately guided by the pair of second guide surfaces provided on one second rail body.

It is preferable that a second transport vehicle;
a third rail including a third travel surface; and
at least one fourth rail including a fourth travel surface are further included,
in which the third rail is spaced downward relative to the at least one first rail and intersects the at least one first rail in a view in an up-down direction,
the at least one fourth rail is disposed between the at least one first rail and the third rail in the up-down direction and is disposed parallel to the at least one first rail in the up-down direction,
the transport vehicle includes a second vehicle body, a third traveling unit configured to cause the second vehicle body to travel along the third rail, a fourth traveling unit configured to cause the second vehicle body to travel along the at least one fourth rail, and a second control unit configured to control the third traveling unit and the fourth traveling unit,
the third traveling unit includes a third wheel and a third orientation changing mechanism configured to change an orientation of the third wheel relative to the second vehicle body, and is configured to perform an orientation change between a third wheel placement orientation, in which the third wheel is placed on the third travel surface, and a third wheel retraction orientation, in which the third wheel is separated from the third travel surface,
the fourth traveling unit includes a fourth wheel and a fourth orientation changing mechanism configured to change the orientation of the fourth wheel relative to the second vehicle body, and is configured to perform an orientation change between a fourth wheel placement orientation, in which the fourth wheel is placed on the fourth travel surface, and a fourth wheel retraction orientation, in which the fourth wheel is separated from the fourth travel surface,
the second control unit is configured to change in mode between (i) a third mode of causing the second vehicle body to travel along the third rail with the third traveling unit in the third wheel placement orientation and the fourth traveling unit in the fourth wheel retraction orientation, and (ii) a fourth mode of causing the second vehicle body to travel along the at least one fourth rail with the fourth traveling unit in the fourth wheel placement orientation and the third traveling unit in the third wheel retraction orientation,
the at least one fourth rail includes a plurality of fourth rails disposed side by side in the first width direction,
each of the plurality of fourth rails includes a pair of fourth rail bodies spaced apart in the first width direction, and
for each of the fourth rail bodies, the fourth rail body and a corresponding first rail body adjacent above the fourth rail body are formed in one piece.

According to this configuration, it is possible to cause the second transport vehicle to travel between the third rail and the fourth rail in the up-down direction, separately from the transport vehicle that travels between the first rail and the second rail in the up-down direction. Also, the second transport vehicle can be caused to travel along the third rail, and the second transport vehicle can be caused to travel along the fourth rail. Also, according to this configuration, since the first rail body and the fourth rail body, which are adjacent to each other in the up-down direction, are formed in one piece, the number of first rail bodies and fourth rail bodies to be installed can be reduced in the entire facility while realizing the configuration where the transport vehicle and the second transport vehicle are caused to travel at different positions in the up-down direction. Thus, it is easy to reduce the number of man-hours when installing the first rail and the fourth rail.

It is preferable that two of the fourth rails adjacent to each other in the first width direction share one of the fourth rail bodies, and a pair of the fourth travel surfaces belonging to each of the two fourth rails adjacent to each other in the first width direction are formed in one fourth rail body.

According to this configuration, two fourth rails adjacent to each other in the first width direction share one fourth rail body, and therefore the number of fourth rail bodies to be installed can be reduced in the entire facility. Thus, it is easy to reduce the number of man-hours when installing the fourth rail.

INDUSTRIAL APPLICABILITY

The technology according to the present disclosure can be used in an article transport facility including a transport vehicle that transports articles.

What is claimed is:

1. An article transport facility including a transport vehicle configured to transport an article, the article transport facility comprising:
   at least one first rail having a first travel surface; and
   at least one second rail having a second travel surface,
   wherein:
   the at least one second rail is spaced upward relative to the at least one first rail and intersects the at least one first rail in a view in an up-down direction, and the transport vehicle comprises:
  a vehicle body disposed between the at least one first rail and the at least one second rail in the up-down direction;
  a first traveling unit configured to cause the vehicle body to travel along a first direction corresponding to a direction in which the at least one first rail extends;
  a second traveling unit configured to cause the vehicle body to travel along a second direction corresponding to a direction in the at least one second rail extends; and
  a control unit configured to control operations of the first traveling unit and the second traveling unit,
wherein:
the first traveling unit comprises a first wheel and a first orientation changing mechanism configured to change an orientation of the first wheel relative to the vehicle body, and the first traveling unit is configured to perform an orientation change between a first wheel placement orientation in which the first wheel is placed on the first travel surface, and a first wheel retraction orientation, in which the first wheel is separated from the first travel surface,
the second traveling unit comprises a second wheel and a second orientation changing mechanism configured to change an orientation of the second wheel relative to the vehicle body, and the second traveling unit is configured to perform an orientation change between a second wheel placement orientation in which the second wheel is placed on the second travel surface, and a second wheel retraction orientation in which the second wheel is separated from the second travel surface, and
the control unit is configured to change in mode between (i) a first mode of causing the vehicle body to travel along the at least one first rail with the first traveling unit in the first wheel placement orientation and the second traveling unit in the second wheel retraction orientation, and (ii) a second mode of causing the vehicle body to travel along the at least one second rail with the second traveling unit in the second wheel placement orientation and the first traveling unit in the first wheel retraction orientation.

2. The article transport facility according to claim 1, wherein the transport vehicle comprises an accommodation portion configured to accommodate the article during travel, and
wherein the accommodation portion is provided in the vehicle body.

3. The article transport facility according to claim 1, wherein the second orientation changing mechanism comprises a second support arm that is swingably coupled to the vehicle body and supports the second wheel, and a second drive unit configured to drive the second support arm, and
wherein the second drive unit changes the orientation of the second wheel relative to the vehicle body by swinging the second support arm about a second swing axis extending in the second direction.

4. The article transport facility according to claim 3, wherein in response to the second orientation changing mechanism changing the orientation of the second traveling unit from the second wheel retraction orientation to the second wheel placement orientation, the second wheel is placed on the second travel surface at a position past an uppermost position of a movement path along which the second wheel moves due to swinging of the second support arm.

5. The article transport facility according to claim 3, wherein the first orientation changing mechanism comprises a first support arm that is swingably coupled to the vehicle body and supports the first wheel, and a first drive unit configured to drive the first support arm, and
wherein the first drive unit changes the orientation of the first wheel relative to the vehicle body by swinging the first support arm about a first swing axis extending in the second direction.

6. The article transport facility according to claim 1, wherein:
the at least one first rail has a first guide surface facing a direction intersecting the first direction in a view in the up-down direction,
the at least one second rail has a second guide surface facing a direction intersecting the second direction in a view in the up-down direction,
the first traveling unit comprises a first guide wheel configured to be guided on the first guide surface,
the first guide wheel is configured to be in contact with the first guide surface while the first traveling unit is in the first wheel placement orientation, and to be separated from the first guide surface while the first traveling unit is in the first wheel retraction orientation,
the second traveling unit comprises a second guide wheel configured to be guided on the second guide surface, and
the second guide wheel is configured to be in contact with the second guide surface while the second traveling unit is in the second wheel placement orientation, and to be separated from the second guide surface while the second traveling unit is in the second wheel retraction orientation.

7. The article transport facility according to claim 1, wherein the at least one first rail comprises a plurality of first rails disposed side by side in a direction intersecting the first direction in a view in the up-down direction, and
wherein the at least one second rail comprises a plurality of second rails disposed side by side in a direction intersecting the second direction in a view in the up-down direction.

8. The article transport facility according to claim 1, wherein the transport vehicle comprises:
  an elevating body coupled to the vehicle body;
  an elevating apparatus configured to raise and lower the elevating body relative to the vehicle body; and
  a holding section supported by the elevating body and configured to hold the article.

9. The article transport facility according to claim 1, wherein the transport vehicle comprises:
  an elevating body coupled to the vehicle body;
  an elevating apparatus configured to raise and lower the elevating body relative to the vehicle body;
  a holding section supported by the elevating body and configured to hold the article;
  a slide apparatus configured to slide the holding section in a horizontal direction relative to the elevating body; and
  an engagement apparatus supported by the elevating body,
wherein:
the at least one first rail comprises an engaged portion,
the engagement apparatus comprises an engaging portion configured to engage with the engaged portion, and an engagement drive unit configured to change an orientation of the engaging portion between an engagement orientation and a release orientation, while the engaging portion is in the engagement orientation, the engaging portion is engaged with the engaged portion to restrict raising, lowering, and tilting of the elevating body, and while the engaging portion is in the release orientation, the engaging portion is separated from the engaged portion to allow raising and lowering of the elevating body, and the control unit causes the engaging portion to have the release orientation in response to the elevating apparatus raising or lowering the elevating body, and causes the engaging portion to have the engagement orientation in response to the slide apparatus causing the holding section to protrude in the horizontal direction relative to the elevating body.

10. The article transport facility according to claim 9, further comprising:

a storage shelf configured to hold the article, and wherein:

the storage shelf is supported by the at least one first rail, below the at least one first rail, the transport vehicle is configured to be capable of executing a delivery operation of delivering the article to the storage shelf and a reception operation of receiving the article from the storage shelf by the slide apparatus sliding the holding section, and in response to the control unit causing the transport vehicle to execute the delivery operation or the reception operation, the control unit causes the elevating mechanism to position the elevating body at a height corresponding to the storage shelf and causes the engaging portion to have the engagement orientation.

11. The article transport facility according to claim 9, wherein the engaged portion is at a position corresponding to a transfer target location where the article is transferred to or from the vehicle in the first direction, and wherein the engaging portion also performs positioning of the elevating body in the first direction while in the engagement orientation.

12. The article transport facility according to claim 9, wherein the transport vehicle further comprises a second elevation apparatus configured to raise and lower the holding section relative to the slide apparatus, below the slide apparatus.

13. The article transport facility according to claim 9, wherein:

the at least one first rail comprises a pair of first rail bodies spaced apart in a first width direction intersecting the first direction in a view in the up-down direction, the elevating apparatus raises and lowers the elevating body between the pair of first rail bodies in the first width direction in a view in the up-down direction, the engaged portion is provided on at least one of the pair of first rail bodies, and the engagement drive unit changes the orientation of the engaging portion between the engagement orientation and the release orientation by extending and retracting the engaging portion in the first width direction.

14. The article transport facility according to claim 9, wherein the engaged portion is fixed to the at least one first rail below the first travel surface.

15. The article transport facility according to claim 1, wherein:

the at least one first rail comprises a plurality of first rails disposed side by side in a first width direction intersecting the first direction in a view in the up-down direction, each of the plurality of first rails comprises a pair of first rail bodies spaced apart in the first width direction, and two of the first rails adjacent to each other in the first width direction share one of the first rail bodies, and a pair of the first travel surfaces belonging to each of the two first rails adjacent to each other in the first width direction are formed in the first rail body.

16. The article transport facility according to claim 15, wherein:

each of the first rails has a first guide surface facing the first width direction, the first traveling unit comprises a first guide wheel configured to be guided on the first guide surface, the first guide wheel is configured to be in contact with the first guide surface while the first traveling unit is in the first wheel placement orientation, and to be separated from the first guide surface while the first traveling unit is in the first wheel retraction orientation, each of the first rail bodies comprises a first main body portion extending in the first direction, and a first wall portion protruding upward from the first main body portion and extending in the first direction, the first travel surfaces are formed by an upward-facing surface of the first main body portion, the first travel surfaces are disposed on opposite sides of the first wall portion in the first width direction, and the first guide surfaces are formed by surfaces of the first wall portion that face opposite sides in the first width direction.

17. The article transport facility according to claim 15, wherein:

the at least one second rail comprises a plurality of second rails disposed side by side in a second width direction intersecting the second direction in a view in the up-down direction, each of the plurality of second rails comprises a pair of second rail bodies spaced apart in the second width direction, and two of the second rails adjacent to each other in the second width direction share one of the second rail bodies, and a pair of the second travel surfaces belonging to each of the two second rails adjacent to each other in the second width direction are formed in the second rail body.

18. The article transport facility according to claim 17, wherein:

each of the second rails has a second guide surface facing the second width direction, the second traveling unit comprises a second guide wheel configured to be guided on the second guide surface, the second guide wheel is configured to be in contact with the second guide surface while the second traveling unit is in the second wheel placement orientation, and to be separated from the second guide surface while the second traveling unit is in the second wheel retraction orientation, each of the second rail bodies comprises a second main body portion extending in the second direction, and a second wall portion protruding upward from the second main body portion and extending in the second direction, the second travel surfaces are formed by an upward-facing surface of the second main body portion, the second travel surfaces are disposed on opposite sides of the second wall portion in the second width direction, and the second guide surfaces are formed by surfaces of the second wall portion that face opposite sides in the second width direction.

19. The article transport facility according to claim 15, further comprising:

a second transport vehicle;

a third rail comprising a third travel surface; and at least one fourth rail comprising a fourth travel surface, wherein:

the third rail is spaced downward relative to the at least one first rail and intersects the at least one first rail in a view in an up-down direction, the at least one fourth rail is disposed between the at least one first rail and the third rail in the up-down direction and is disposed parallel to the at least one first rail in the up-down direction, the transport vehicle comprises:

a second vehicle body;

a third traveling unit configured to cause the second vehicle body to travel along the third rail;

a fourth traveling unit configured to cause the second vehicle body to travel along the at least one fourth rail, and a second control unit configured to control the third traveling unit and the fourth traveling unit, wherein:

the third traveling unit comprises a third wheel and a third orientation changing mechanism configured to change an orientation of the third wheel relative to the second vehicle body, and is configured to perform an orientation change between a third wheel placement orientation in which the third wheel is placed on the third travel surface, and a third wheel retraction orientation in which the third wheel is separated from the third travel surface, the fourth traveling unit comprises a fourth wheel and a fourth orientation changing mechanism configured to change the orientation of the fourth wheel relative to the second vehicle body, and is configured to perform an orientation change between a fourth wheel placement orientation in which the fourth wheel is placed on the fourth travel surface, and a fourth wheel retraction orientation in which the fourth wheel is separated from the fourth travel surface, the second control unit is configured to change in mode between (i) a third mode of causing the second vehicle body to travel along the third rail with the third traveling unit in the third wheel placement orientation and the fourth traveling unit in the fourth wheel retraction orientation, and (ii) a fourth mode of causing the second vehicle body to travel along the at least one fourth rail with the fourth traveling unit in the fourth wheel placement orientation and the third traveling unit in the third wheel retraction orientation, the at least one fourth rail comprises a plurality of fourth rails disposed side by side in the first width direction, each of the plurality of fourth rails comprises a pair of fourth rail bodies spaced apart in the first width direction, and for each of the fourth rail bodies, the fourth rail body and a corresponding first rail body adjacent above the fourth rail body are formed in one piece.

20. The article transport facility according to claim 19, wherein two of the fourth rails adjacent to each other in the first width direction share one of the fourth rail bodies, and a pair of the fourth travel surfaces belonging to each of the two fourth rails adjacent to each other in the first width direction are formed in the fourth rail body.

* * * * *